(12) United States Patent
Koker

(10) Patent No.: US 12,147,346 B2
(45) Date of Patent: *Nov. 19, 2024

(54) METHOD AND APPARATUS FOR SHARED VIRTUAL MEMORY TO MANAGE DATA COHERENCY IN A HETEROGENEOUS PROCESSING SYSTEM

(71) Applicant: Intel Corporation, Santa Clara, CA (US)

(72) Inventor: Altug Koker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/531,432

(22) Filed: Dec. 6, 2023

(65) Prior Publication Data
US 2024/0152457 A1    May 9, 2024

Related U.S. Application Data

(60) Continuation of application No. 17/190,671, filed on Mar. 3, 2021, now Pat. No. 11,921,635, which is a
(Continued)

(51) Int. Cl.
*G06F 12/00* (2006.01)
*G06F 12/0804* (2016.01)
(Continued)

(52) U.S. Cl.
CPC ...... *G06F 12/0815* (2013.01); *G06F 12/0804* (2013.01); *G06F 12/0811* (2013.01);
(Continued)

(58) Field of Classification Search
CPC ............ G06F 12/0815; G06F 12/0804; G06F 12/0811; G06F 12/1009; G06F 12/1045;
(Continued)

(56) References Cited

U.S. PATENT DOCUMENTS

| 5,787,476 A | 7/1998 | Laudon |
| 7,680,987 B1 | 3/2010 | Clark |

(Continued)

FOREIGN PATENT DOCUMENTS

| CN | 109313606 A | 2/2019 |
| DE | 112017003389 T5 | 3/2019 |

(Continued)

OTHER PUBLICATIONS

PCT International Search Report and Written Opinion for PCT/US2017/030895, dated Aug. 1, 2017, 15 pages.
(Continued)

*Primary Examiner* — Craig S Goldschmidt
(74) *Attorney, Agent, or Firm* — Jaffery Watson Mendonsa & Hamilton LLP

(57) ABSTRACT

Embodiments described herein provide a scalable coherency tracking implementation that utilizes shared virtual memory to manage data coherency. In one embodiment, coherency tracking granularity is reduced relative to existing coherency tracking solutions, with coherency tracking storage memory moved to memory as a page table metadata. For example and in one embodiment, storage for coherency state is moved from dedicated hardware blocks to system memory, effectively providing a directory structure that is limitless in size.

20 Claims, 19 Drawing Sheets

Related U.S. Application Data division of application No. 15/203,499, filed on Jul. 6, 2016, now abandoned.

(51) Int. Cl.
*G06F 12/0811* (2016.01)
*G06F 12/0815* (2016.01)
*G06F 12/1009* (2016.01)
*G06F 12/1045* (2016.01)

(52) U.S. Cl.
CPC ...... *G06F 12/1009* (2013.01); *G06F 12/1045* (2013.01); *G06F 12/1063* (2013.01); *G06F 2212/1021* (2013.01); *G06F 2212/1024* (2013.01); *G06F 2212/281* (2013.01); *G06F 2212/302* (2013.01); *G06F 2212/608* (2013.01); *G06F 2212/656* (2013.01); *G06F 2212/657* (2013.01); *G06F 2212/68* (2013.01); *G06F 2212/682* (2013.01); *G06F 2212/684* (2013.01)

(58) Field of Classification Search
CPC ......... G06F 12/0163; G06F 2212/1021; G06F 2212/1024; G06F 2212/281; G06F 2212/302; G06F 2212/608; G06F 2212/656; G06F 2212/657; G06F 2212/68; G06F 2212/682; G06F 2212/684
See application file for complete search history.

(56) References Cited

U.S. PATENT DOCUMENTS

| | | |
|---|---|---|
| 8,683,260 B1 | 3/2014 | Zhang |
| 2002/0062409 A1 | 5/2002 | Lasserre |
| 2009/0307385 A1 | 12/2009 | Hiramatsu |
| 2011/0252200 A1* | 10/2011 | Hendry ............... G06F 12/0831 711/147 |
| 2014/0281234 A1 | 9/2014 | Power |
| 2016/0019168 A1 | 1/2016 | Rychlik |
| 2016/0188466 A1 | 6/2016 | Hady |

FOREIGN PATENT DOCUMENTS

| | | |
|---|---|---|
| KR | 101442643 | 9/2014 |
| WO | 2018009267 | 1/2018 |

OTHER PUBLICATIONS

Notice of Allowance for U.S. Appl. No. 17/190,671, mailed Nov. 7, 2023, 8 pages.

Office Action for CN201780035228.6, mailed Jul. 13, 2023, 6 pages.

\* cited by examiner

METHOD AND APPARATUS FOR SHARED VIRTUAL MEMORY TO MANAGE DATA COHERENCY IN A HETEROGENEOUS PROCESSING SYSTEM

CLAIM TO PRIORITY

This application is a continuation of U.S. application Ser. No. 17/190,671, filed Mar. 3, 2021, which is a divisional of and claims the benefit of and priority to U.S. application Ser. No. 15/203,499, entitled Method and Apparatus for Shared Virtual Memory to Manage Data Coherency in a Heterogeneous Processing System, by Altug Koker, filed Jul. 6, 2016, the entire contents of which are incorporated herein by reference.

TECHNICAL FIELD

Embodiments generally relate to graphics processing logic. More particularly, embodiments relate to an apparatus to manage data coherency in a heterogeneous processing system.

BACKGROUND

Existing hardware based solutions of coherency tracking are performed via inclusive caches, snoop filters, region directories, or block directories. Such hardware solutions are costly in terms of die area and power consumption. For example, an existing hardware solution tracks ownership per cache line via inclusive caches or snoop filters. Each ownership exchange incurs overhead related to multiple passes via ownership pipelines and are tracked via costly structures which store cache coherency states. Additionally, existing hardware solutions may not scale when applied to increased bandwidth processing implementations.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
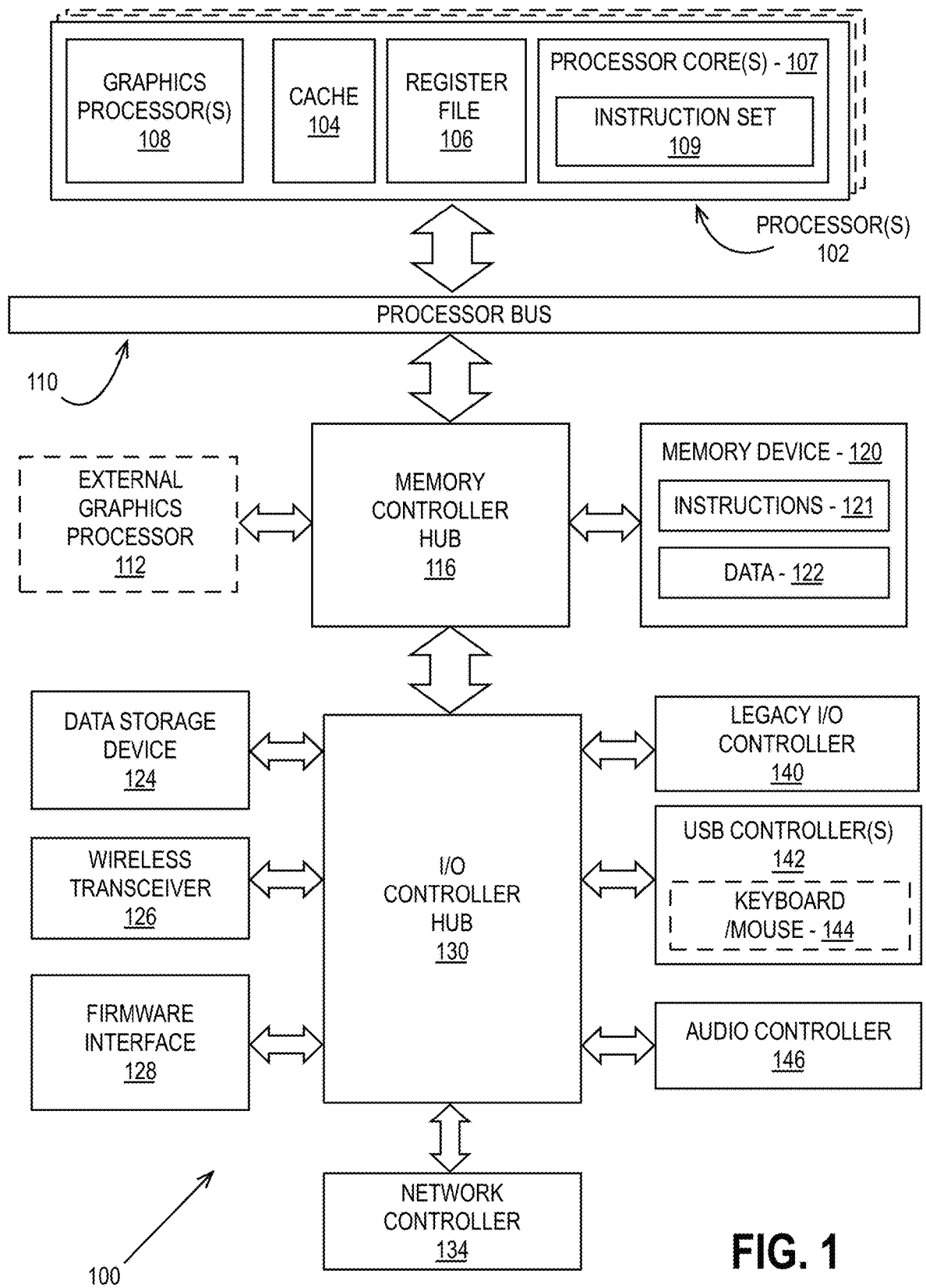
FIG. 1 is a block diagram of an embodiment of a computer system with a processor having one or more processor cores and graphics processors.

Embodiments described herein provide a scalable coherency tracking implementation that utilizes shared virtual memory to manage data coherency. In one embodiment, coherency tracking granularity is reduced relative to existing coherency tracking solutions, with coherency tracking storage memory moved to memory as a page table metadata. For example and in one embodiment, storage for coherency state is moved from dedicated hardware blocks to system memory, effectively providing a directory structure that is limitless in size. In one embodiment, hardware coherency tracking can be completely eliminated, along with penalties associated with capacity related victimizations within a hardware based coherency cache. Page tables can be used to locate the coherency information, which can be stored as page table metadata. Storing coherency information within page table metadata enables the allocation of local coherency caching within CPU and GPU as part of a translation lookaside buffer (TLB).

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-14 provide an overview of exemplary data processing system and graphics processor logic that incorporates or relates to the various embodiments. FIGS. 14-19 provide specific details of the various embodiments. Although some of the following embodiments are described with reference to a graphics processor, similar techniques and teachings can be applied to other types of circuits or semiconductor devices, as the teachings are applicable to any processor or machine that manipulates or processes image data.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
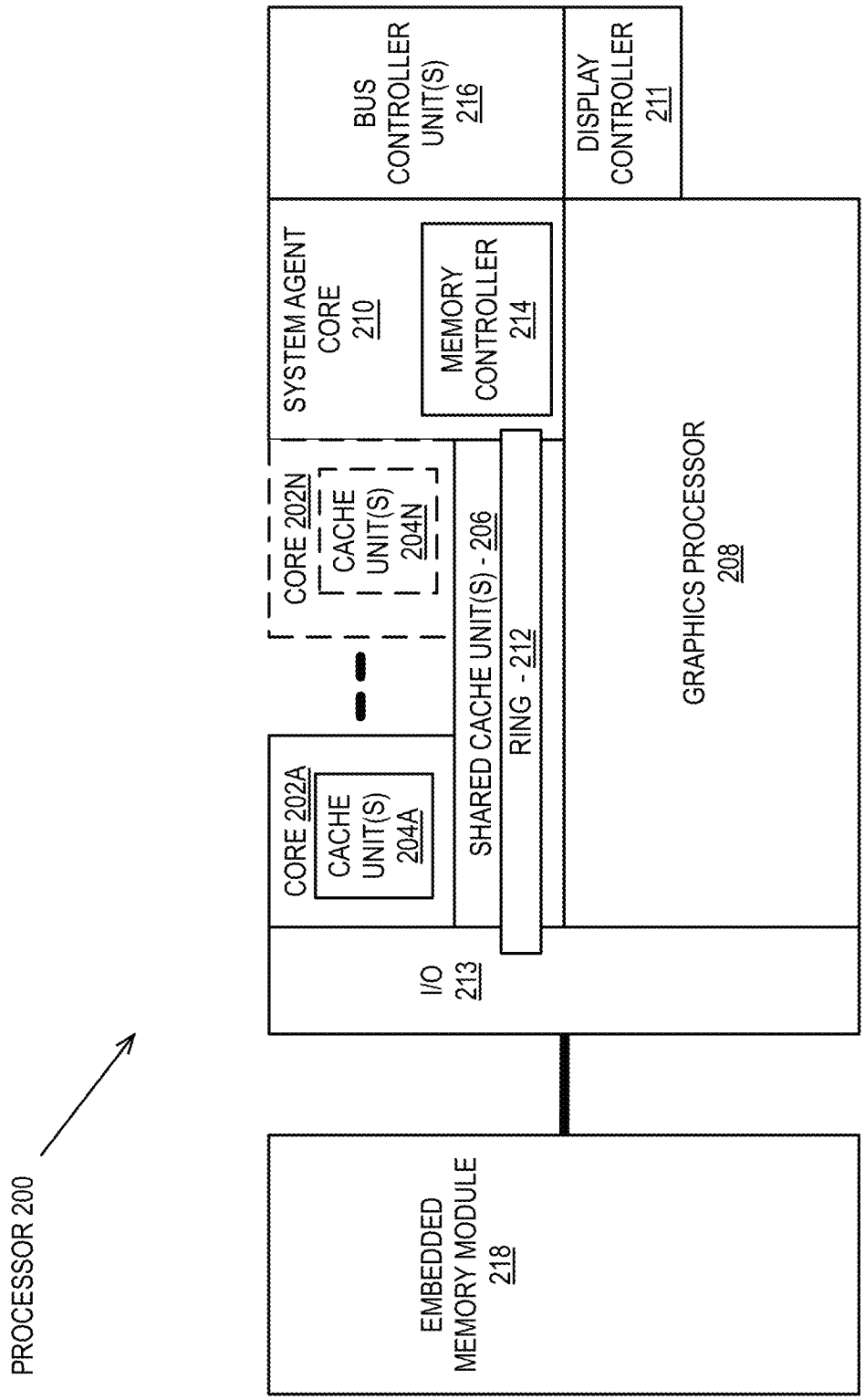
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N.

In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring-based interconnect 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring-based interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
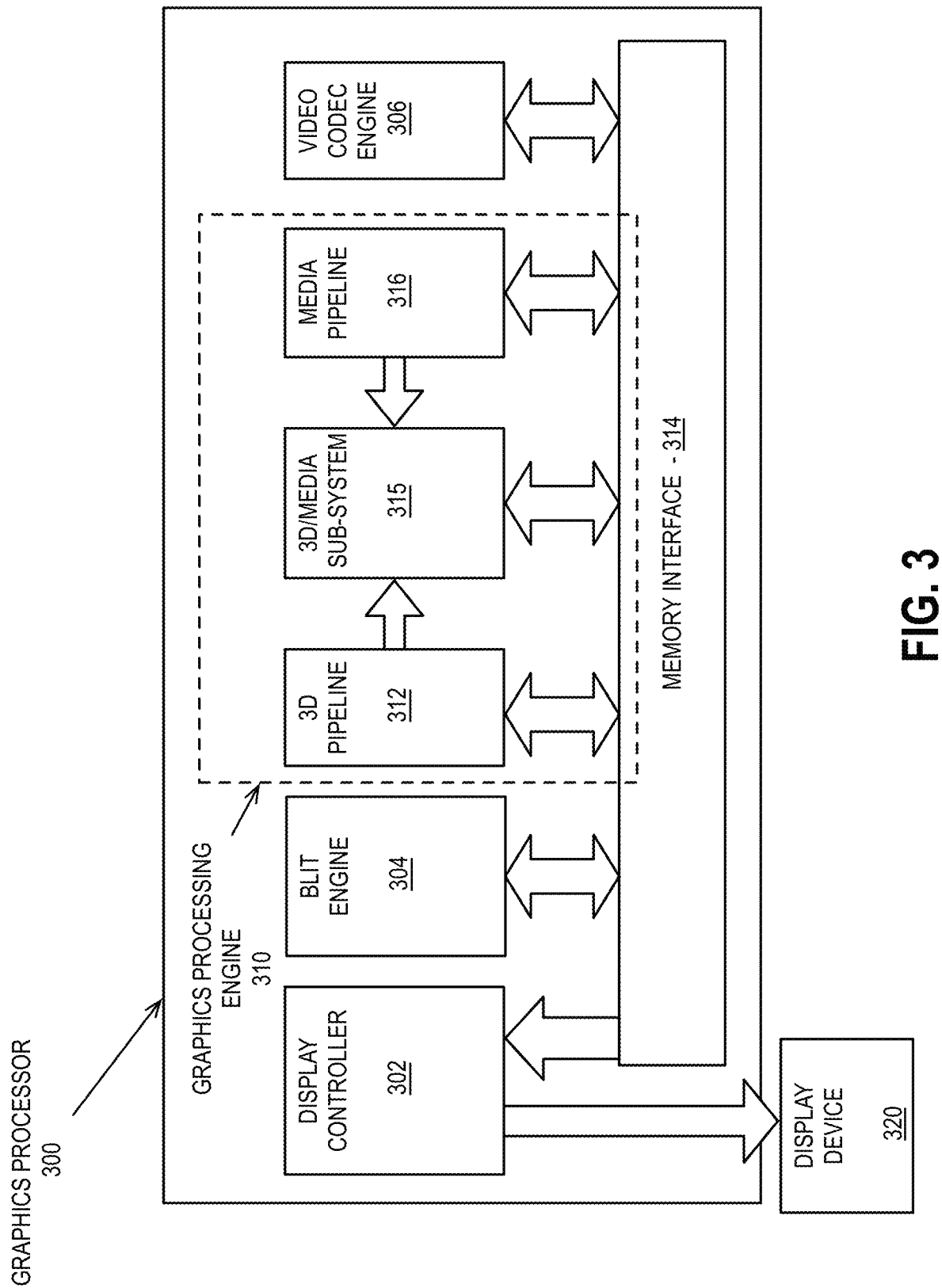
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
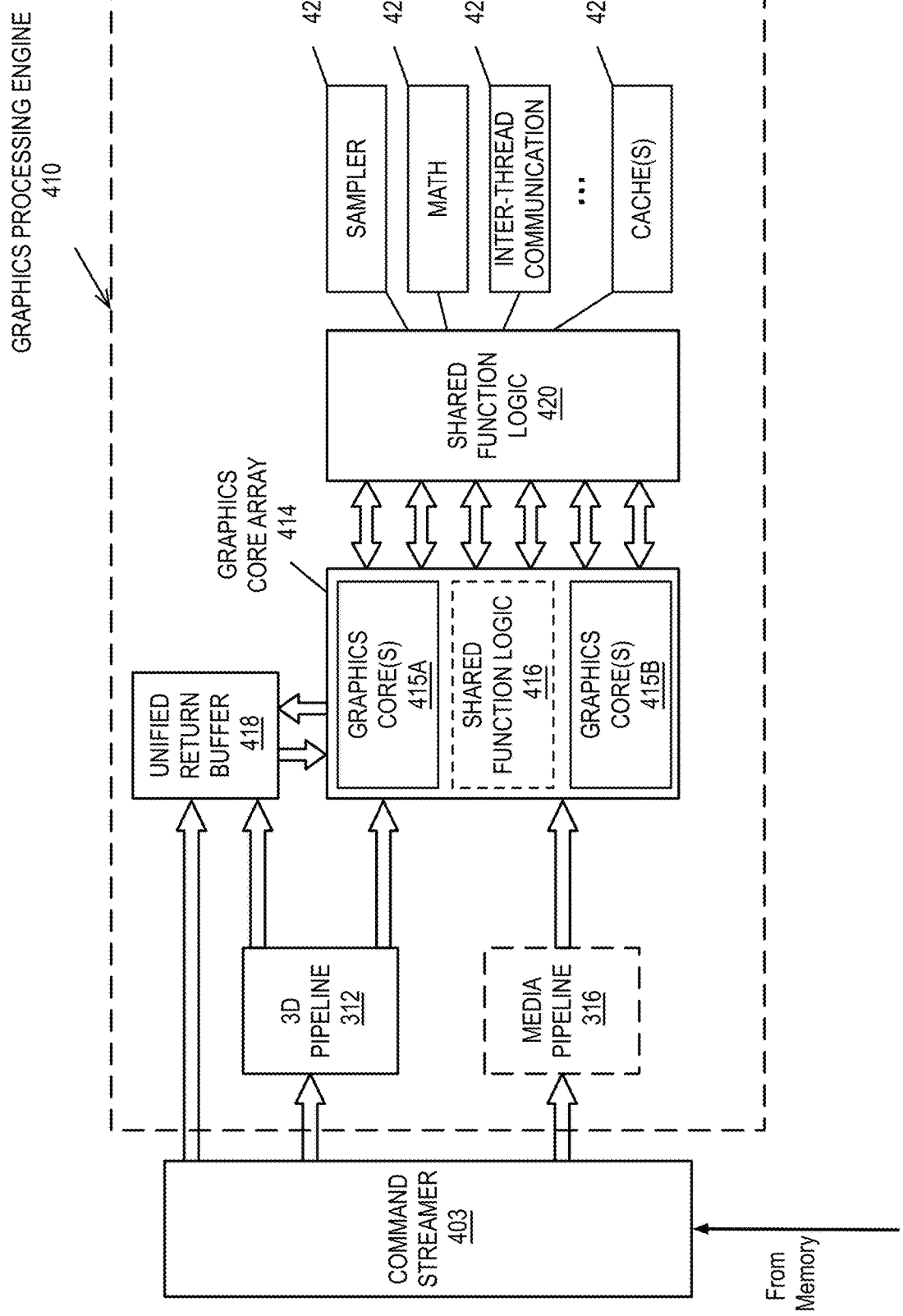
FIG. 4 is a block diagram of an embodiment of a graphics processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
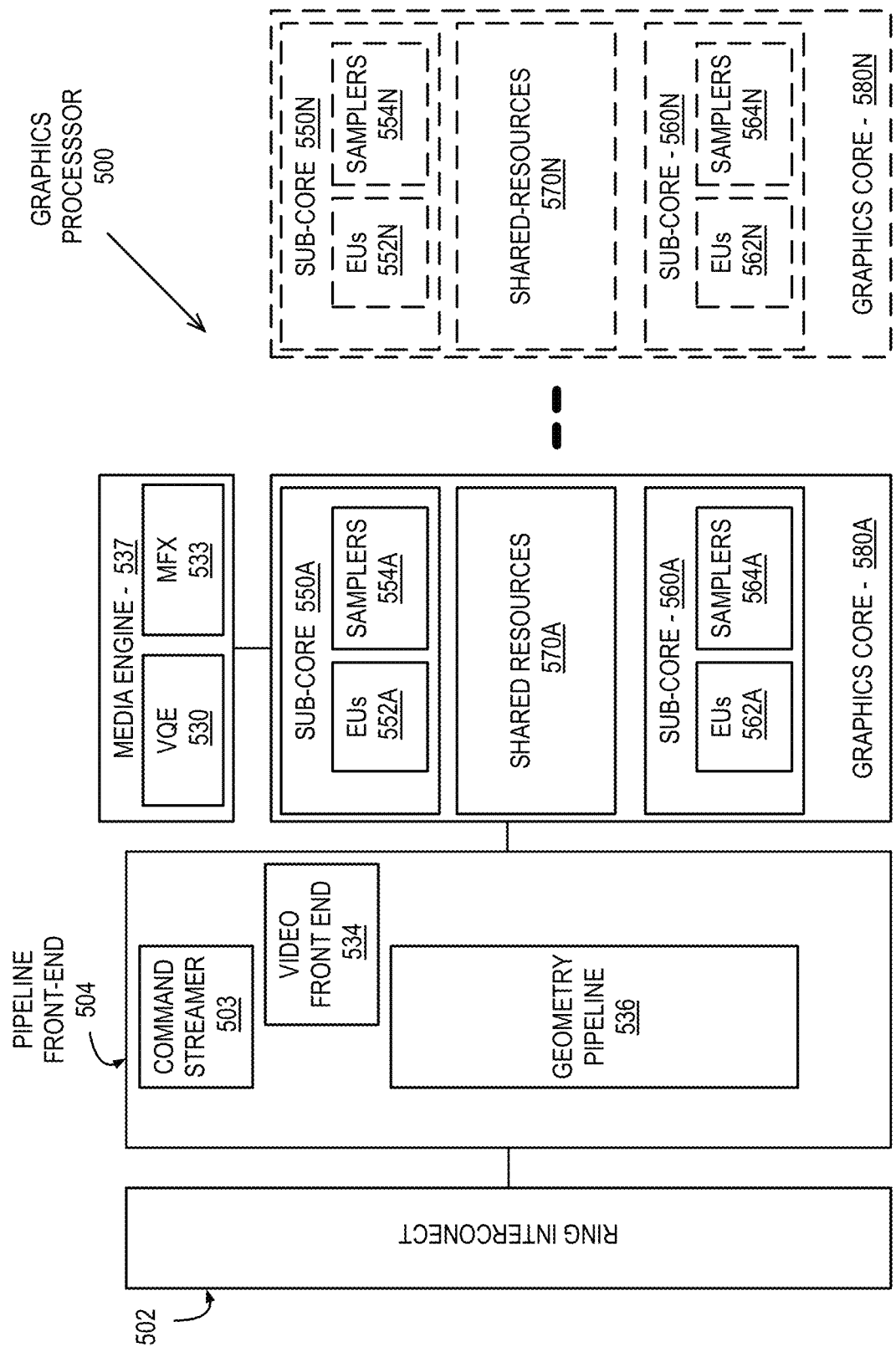
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
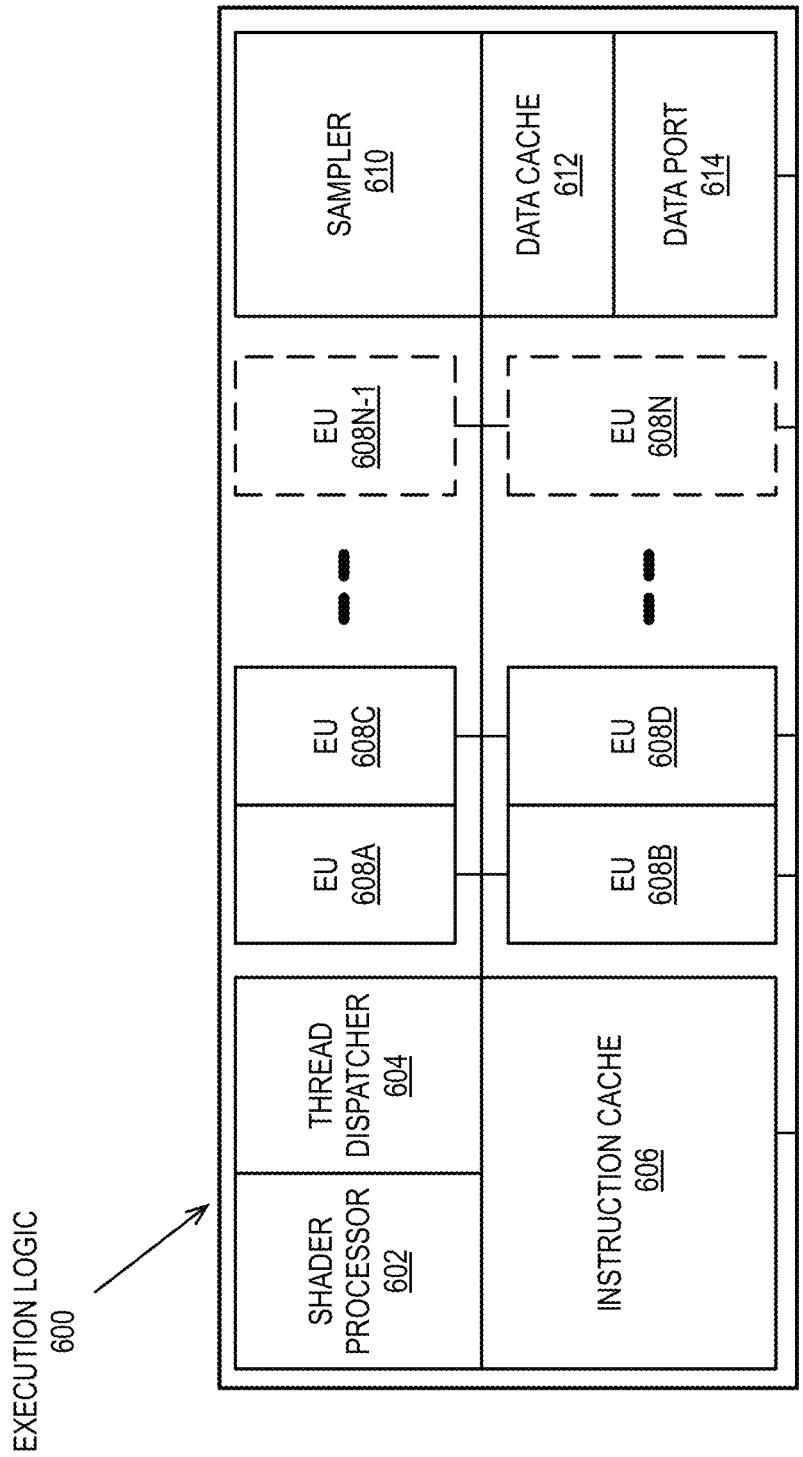
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
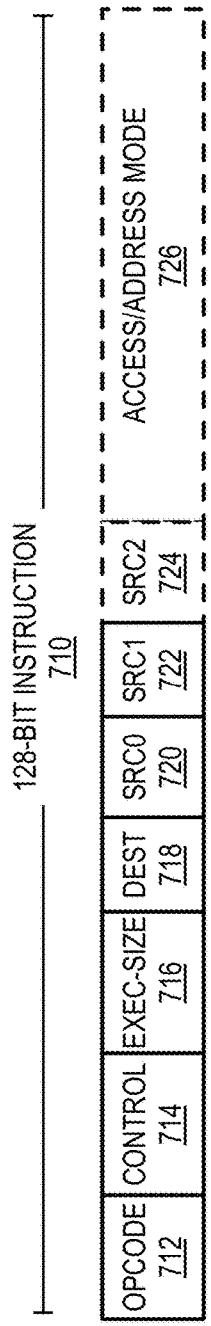
FIG. 7 illustrates graphics processor execution unit instruction formats according to an embodiment.
Figure 7:
Figure 7:
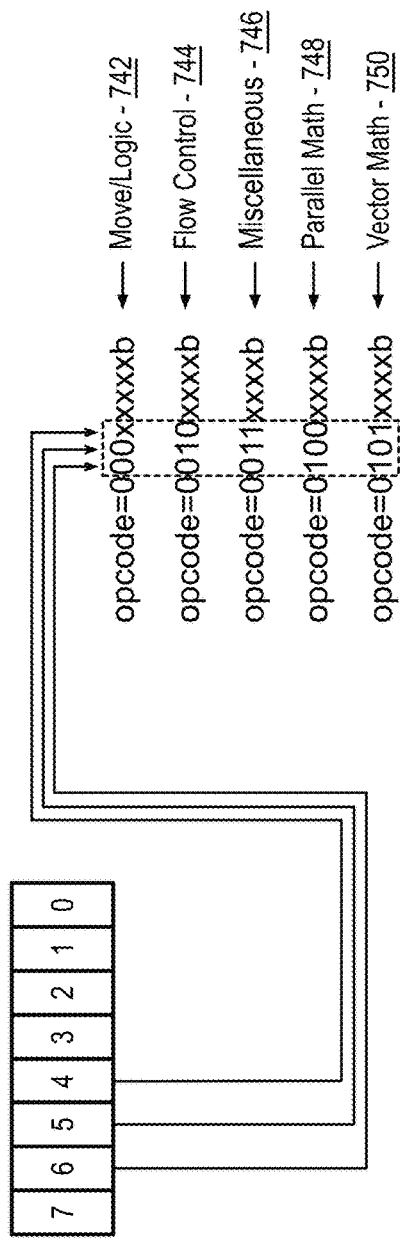

FIG. 7 is a block diagram illustrating graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, the graphics processor instruction formats 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
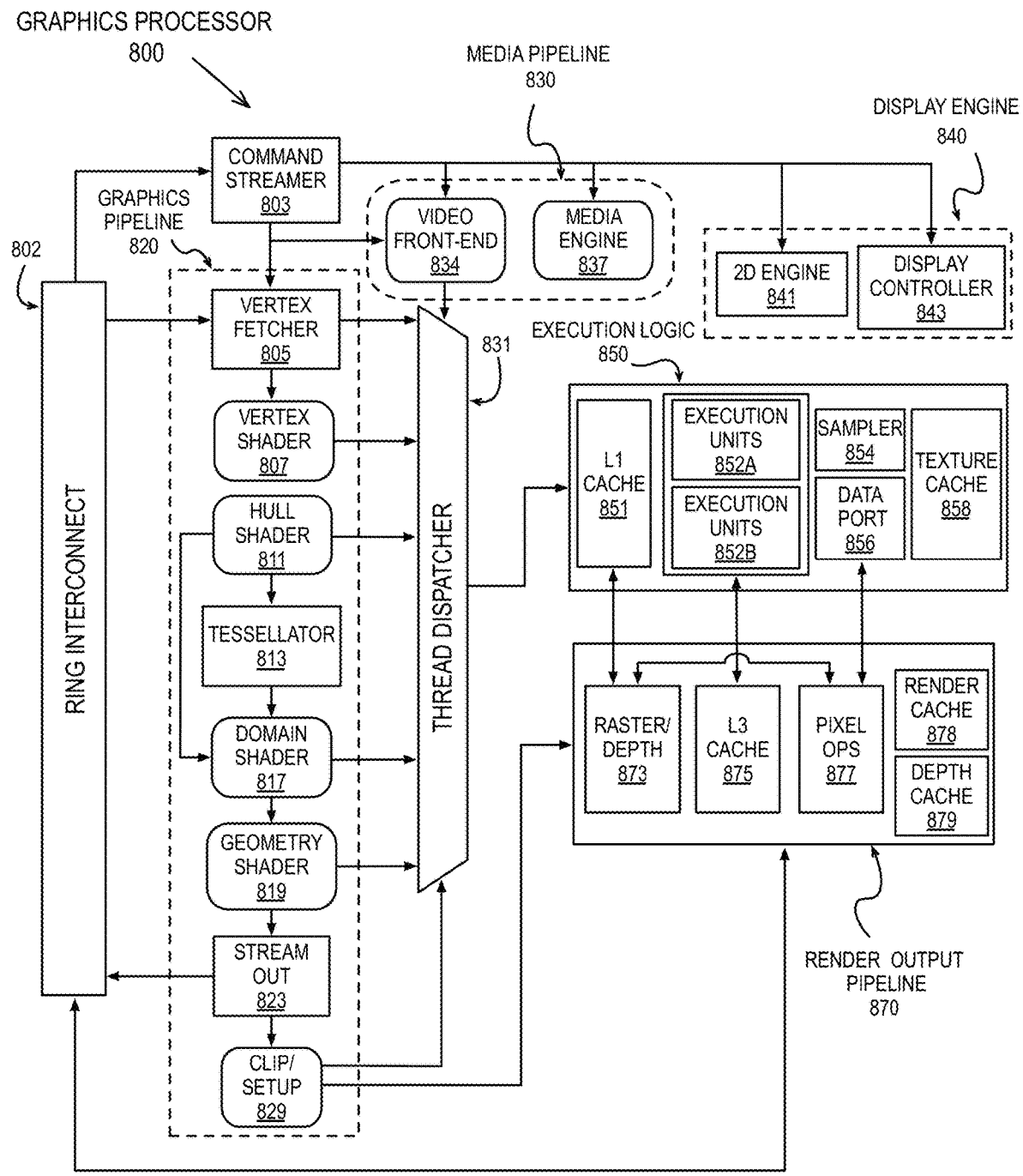
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
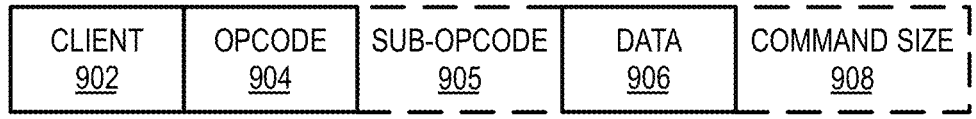
FIG. 9A is a block diagram illustrating a graphics processor command format according to an embodiment.
Figure 9B:
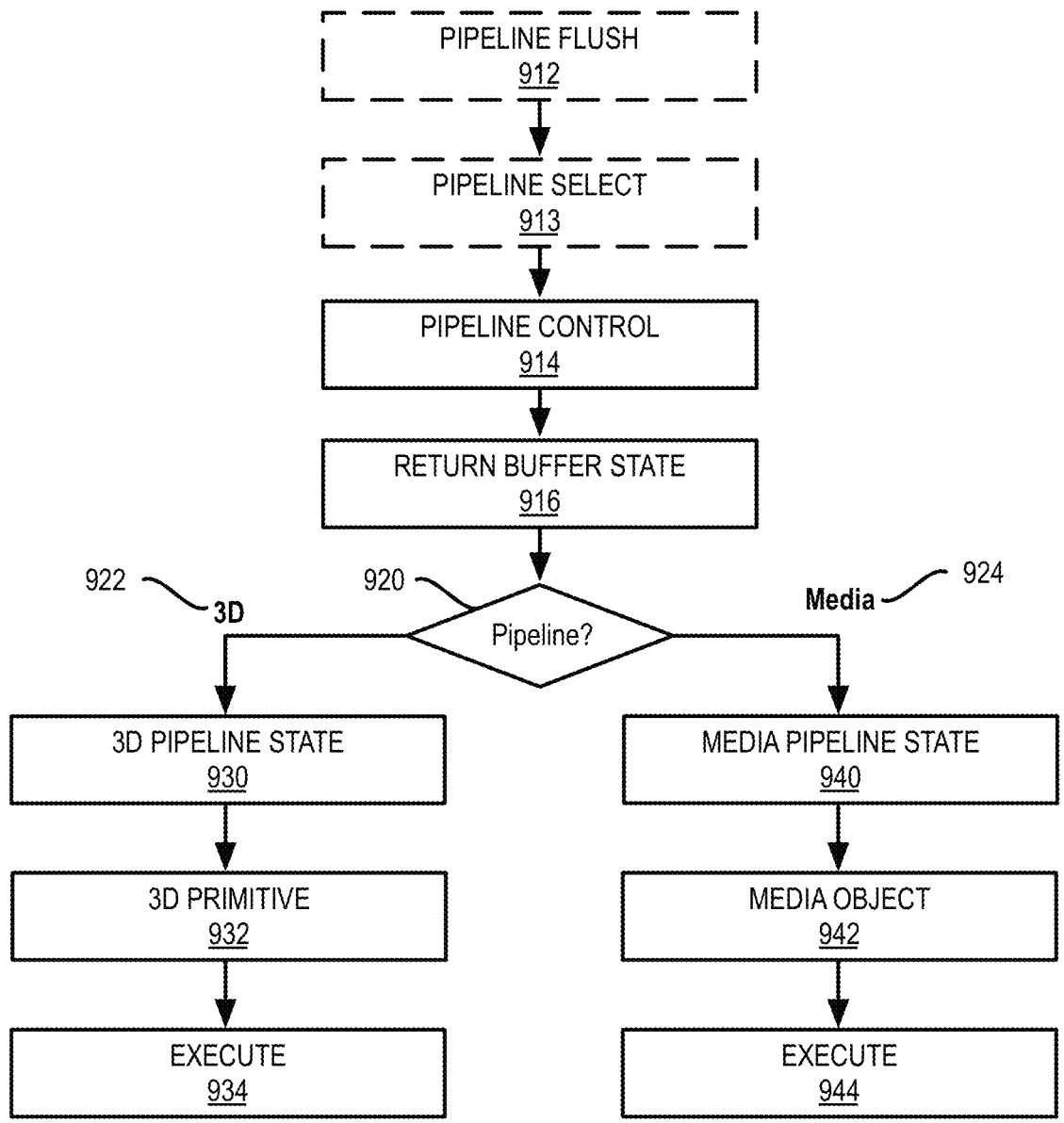
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
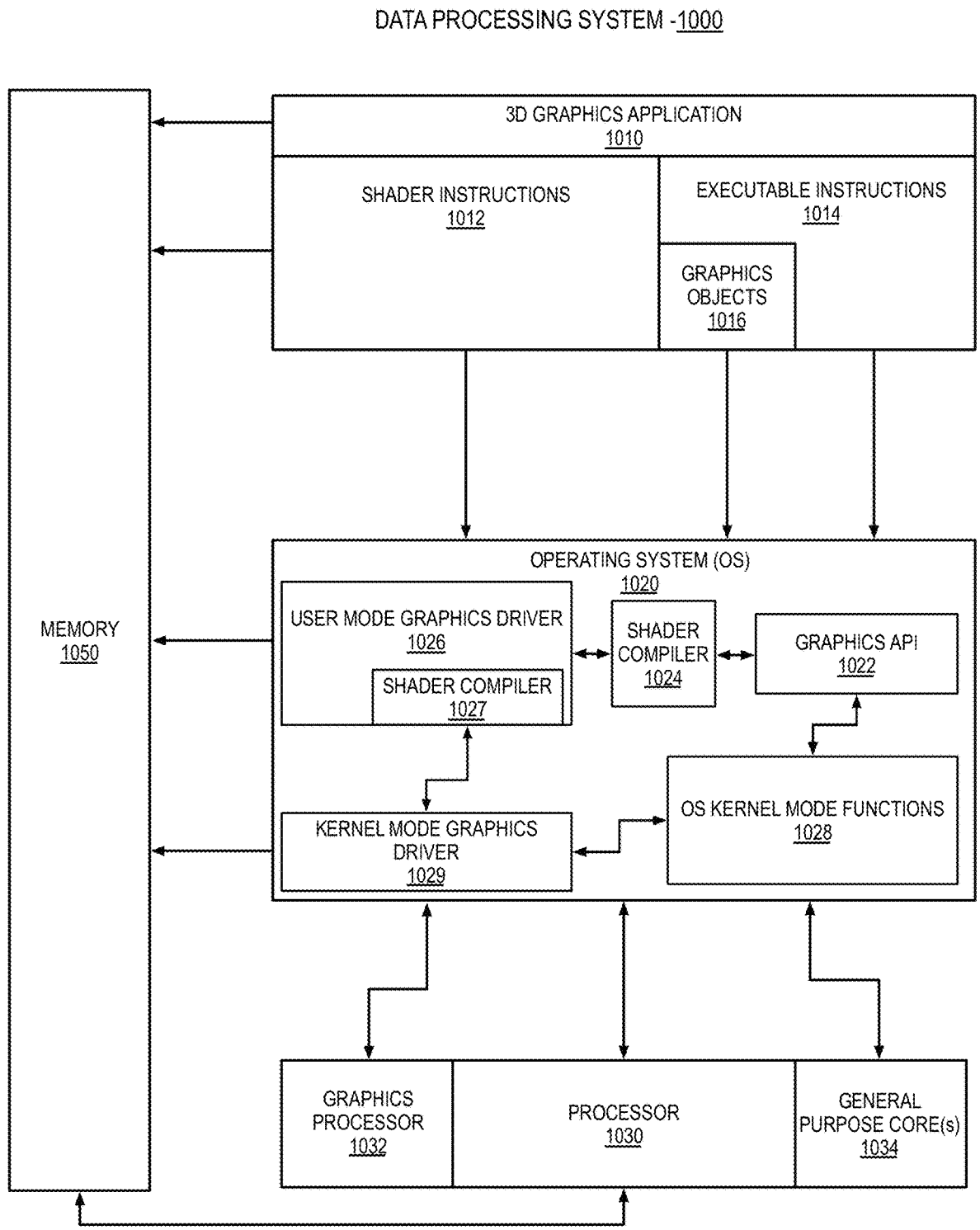
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034.

The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
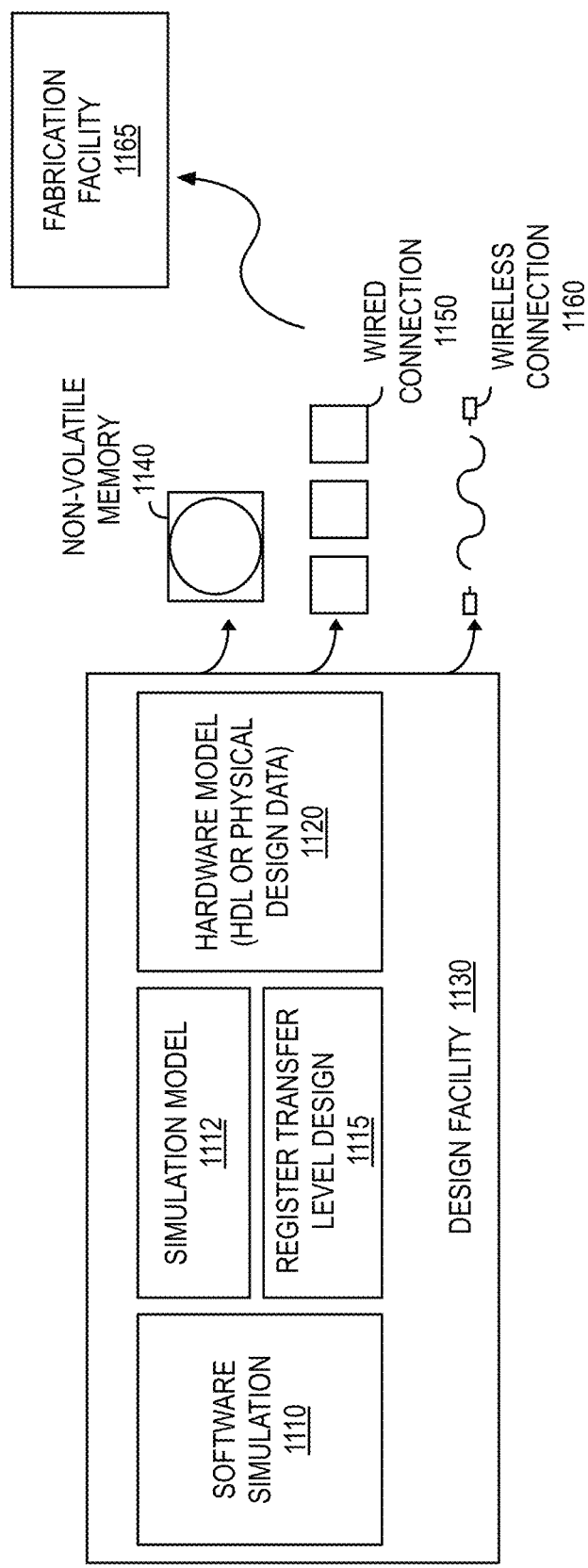
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3 rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuits

Figure 12:
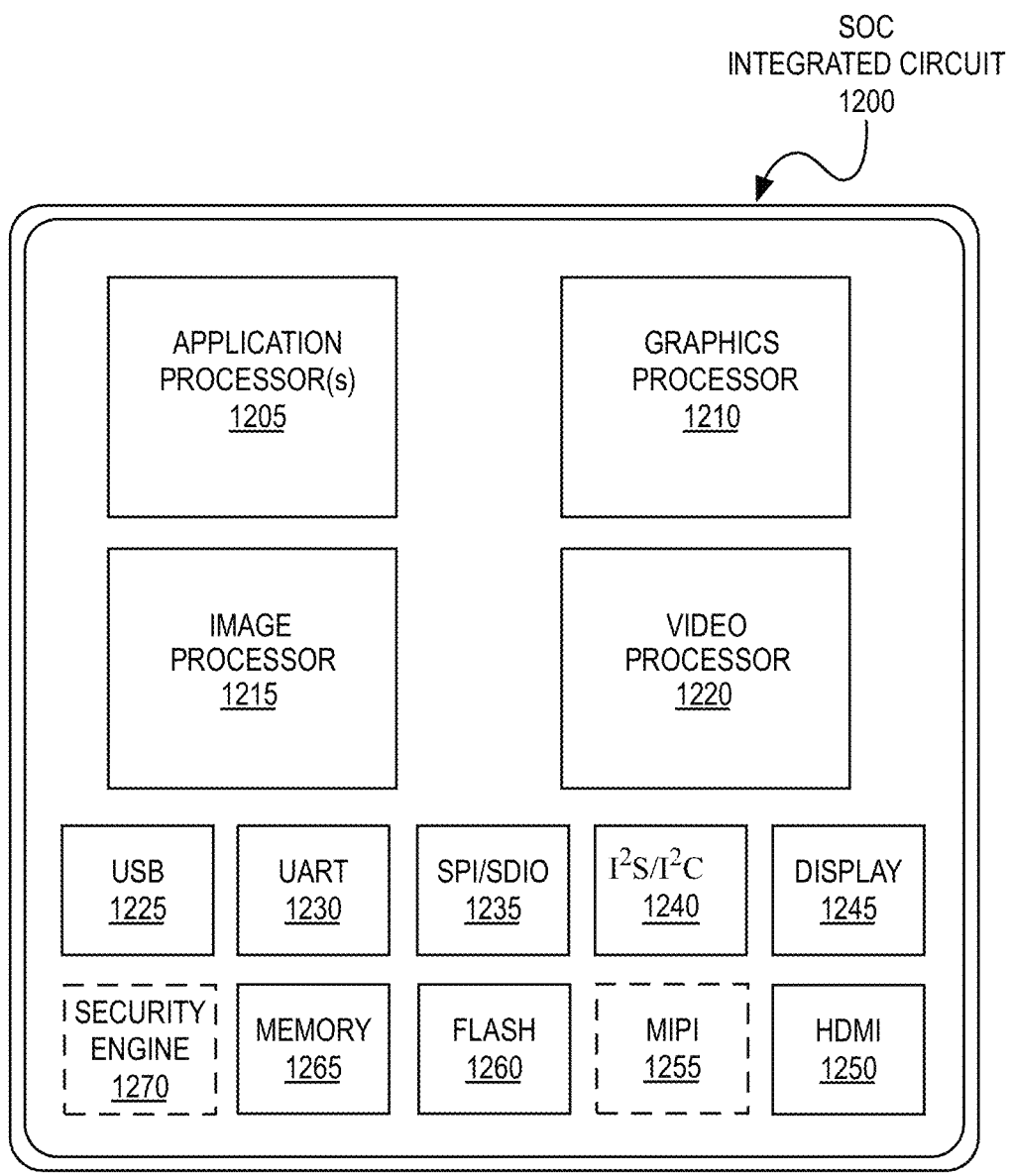
FIG. 12 is a block diagram illustrating an exemplary system on a chip integrated circuit that may be fabricated using one or more IP cores, according to an embodiment.
Figure 13:
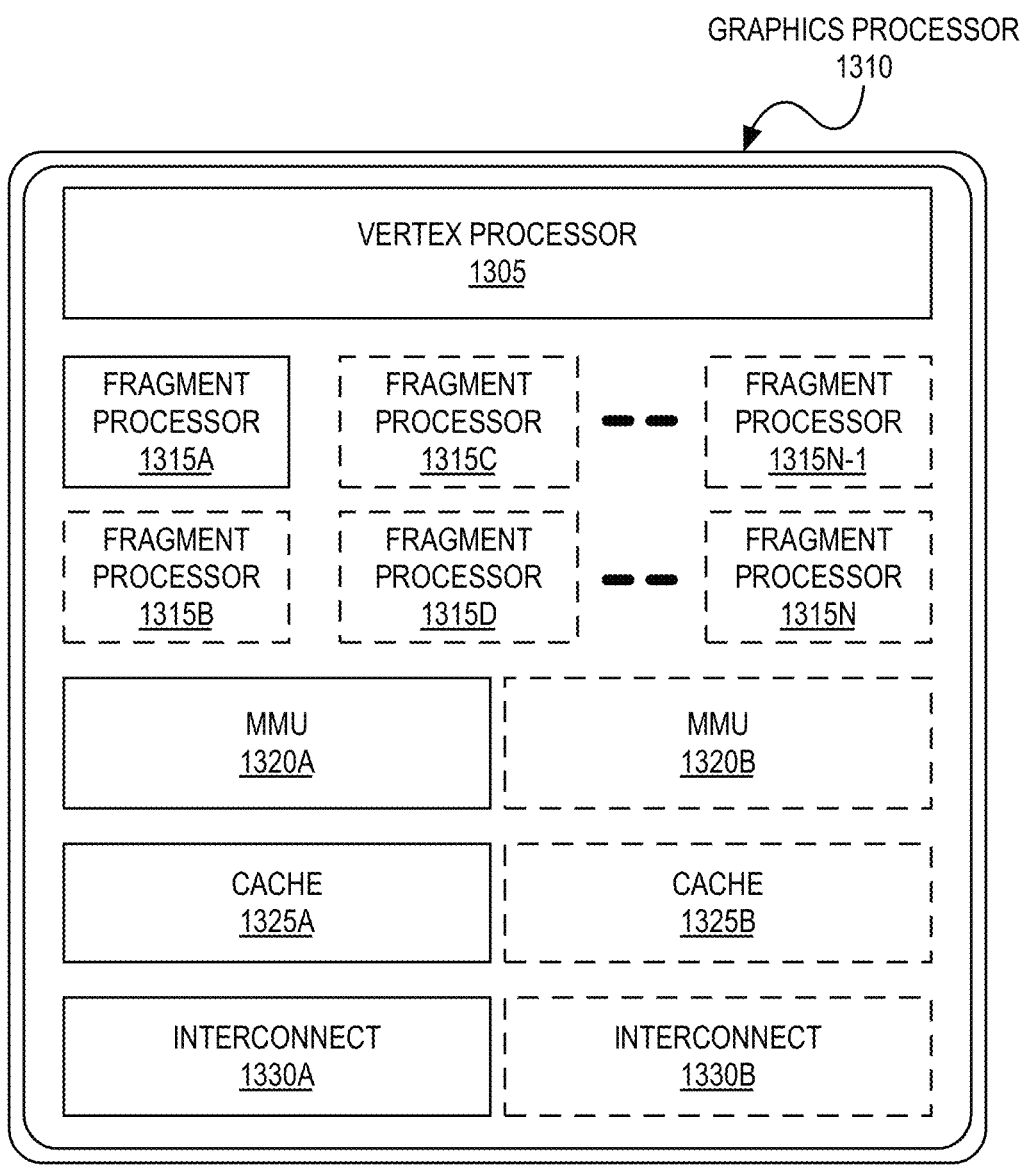
FIG. 13 is a block diagram illustrating an exemplary graphics processor of a system on a chip integrated circuit.
Figure 14:
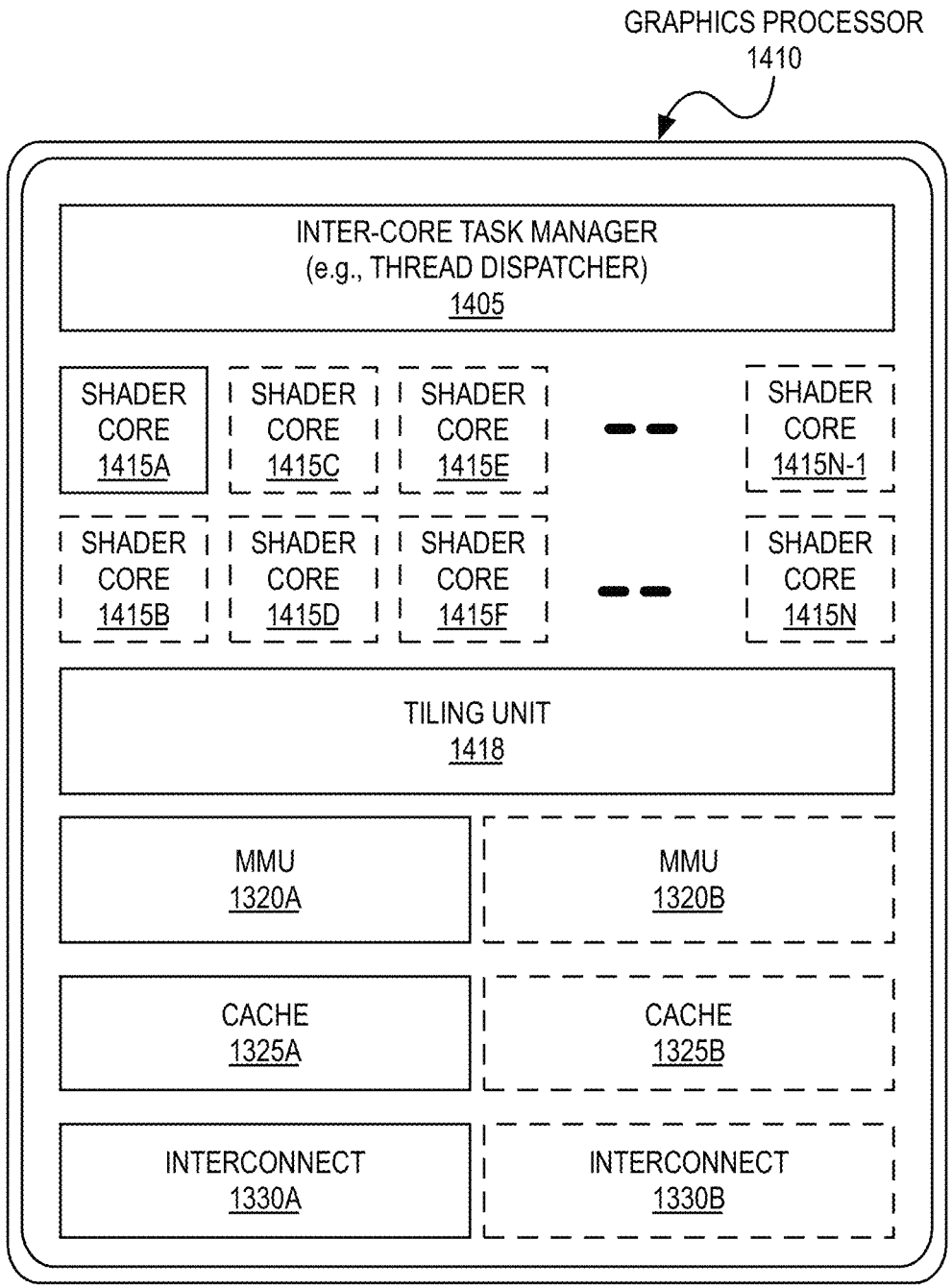
FIG. 14 is a block diagram illustrating an additional exemplary graphics processor of a system on a chip integrated circuit.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12.

Graphics processor 1310 includes a vertex processor 1305 and one or more fragment processor(s) 1315A-1315N. Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N and a tiling unit 1418 to accelerate tiling operations for tile-based rendering, in which rendering operations for a scene are subdivided in image space, for example to exploit local spatial coherence within a scene or to optimize use of internal caches.

Managing Data Coherency in a Heterogeneous Processing System

Embodiments described herein provide a scalable coherency tracking implementation that utilizes shared virtual memory to manage data coherency. In one embodiment, coherency tracking granularity is reduced relative to existing coherency tracking solutions, with coherency tracking storage memory moved to memory as a page table metadata. For example and in one embodiment, storage for coherency state is moved from dedicated hardware blocks to memory, effectively providing a directory structure effectively limitless in size. In one embodiment, hardware coherency tracking can be completely eliminated, along with penalties associated with capacity related victimizations within a hardware based coherency cache. Page tables can be used to locate the coherency information, which can be stored as page table metadata. Storing coherency information within page table metadata enables the allocation of local coherency caching within CPU and GPU as part of a translation lookaside buffer (TLB).

Cache Coherency Overview

Cache coherency mechanisms can be used for processing systems having multiple caches. Cache coherency systems ideally ensure that any read from any cache by any processor can read the most recently written data associated with the read, and that writes to memory are seen in proper order, although various degrees of coherency strictness may be enforced by different memory systems.

Cache coherency can be implemented using one or a combination of snooping based systems or directory based systems. Directory based systems keep track of cache entries for shared data using coherency directories and buffers, which can be distributed across the various cache memories. Coherency requests can be satisfied via point to point requests between processors and caches. The coherency directory acts as a filter through which a processor asks permission to load an entry from the primary memory to the cache associated with the processor. When an entry is changed, the directory either updates or invalidates the other caches with that entry. Snooping based systems monitor requests on a memory bus and invalidates cached data as necessary based on activity occurring on other processors. Some snooping based systems can additionally update local copies of data based on snooped traffic.

Various cache coherency protocols can be used to track coherency state for a cache line in a coherent system. Coherency states include but are not limited to modified, invalid, shared, exclusive, and owned. Coherency protocols can be classified based on which of these coherency states are tracked (e.g., MSI, MESI, MOESI, etc.). Modified cache lines are dirty, indicating that the cache line has been locally modified. A cache line in the modified state for one processor cache is in the invalid state for other processors caches. Cache lines in the invalid state are known to contain stale data that has been updated in another cache. Cache lines in the shared state contain clean copies of the contents of main memory. These cache lines can be used to serve read requests but cannot be written. Multiple caches are allowed to have a copy of the same memory location in "shared" state at the same time. Exclusive cache lines are also clean copies of the contents of main memory. However, when a processor holds a cache line in the exclusive state, no other processor may hold the cache line at the same time and other copies of the cache line are invalid in the caches of other processors. Owned cache lines indicate that the cache line is one of several valid copies of the cache line, but the processor that owns the cache line has the exclusive write to make changes to the cache line. The processor having ownership then broadcasts any changes to the owned cache lines to all other caches sharing the cache line, enabling the dirty sharing of data without requiring a write-back to memory. An owned cache line may be changed to the modified state after invalidating all shared copies or changed to the shared state by writing the modifications back to main memory.

Figure 15:
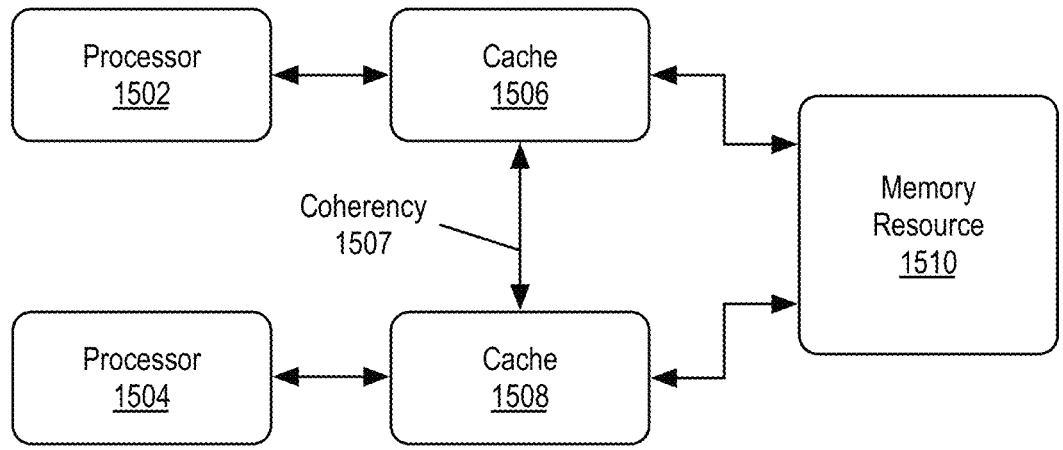
FIG. 15 illustrates an exemplary coherent cache system.

FIG. 15 illustrates an exemplary coherent cache system 1500. In the exemplary coherent cache system 1500, multiple processor clients (e.g., processor 1502, processor 1504) access a shared memory resource 1510. Processor 1502 couples with cache 1506. Cache 1506 caches data resulting from access requests by processor 1502 to the memory resource 1510. Processor 1504 couples with cache 1508. Cache 1508 caches data resulting from access requests by the processor 1504 to the memory resource 1510. A coherency system 1507 can be used to maintain coherency between cache 1506 and cache 1508.

For example, a read made by a processor 1502 to an address in the memory resource 1510 that occurs after a write by processor 1504 to the same address should return the written value written by processor 1504 if no other writes are made to the address by any other processors between the write and the read and the write by processor 1504 is sufficiency separated in time from the read by processor 1502. As the write by processor 1504 may be stored in cache 1508, the coherency system 1507 ensures that an entry in cache 1506 associated with the updated entry in cache 1508 is, at the least, invalidated after the entry in cache 1508 is updated.

Heterogeneous Processing System Coherence

Existing heterogeneous systems include at least one graphics processor and one or more application processors (e.g., central processors, or CPUs), which may be present on the same die. Such heterogeneous systems can provide an efficient compute solution that enables small form factors and enhanced power utilization. Some system enable the application processors (e.g., CPUs) and a graphics processor (GPU) to connect to a shared memory architecture via dedicated and/or common caches. Current CPU and GPU usage models decouple the compute elements, such that a CPU is used for common compute tasks and a GPU is utilized for specialized tasks, such as 3D gaming or parallel compute operations. These operations may be temporally separated in operation and can be managed via multiple levels of software.

However it is possible to enable usage models in which a CPU and a GPU execute tasks simultaneously. Such usage models can benefit greatly from a low latency data sharing architecture that enables application developers to distribute work efficiently on a heterogeneous system. As greater parallelism is extracted from GPUs to assist CPU compute operations, a greater need arises for enhanced memory bandwidth for use in heterogeneous compute system, such as the enhanced bandwidth provided by high bandwidth memory (HBM) technology.

For system on a chip (SoC) integrated circuits, which can include one or more CPUs and GPUs integrated within the same die, shared virtual memory (SVM) is an increasingly common memory subsystem. SVM systems can enable the use of a shared address space between GPUs and CPUs, providing system coherence between compute elements and enabling a seamless transition between compute elements for applications. However providing system coherence efficiently and in a cost effective way while preserving system bandwidth is non-trivial, and current architectures are either ineffective in terms of system performance or have a high cost in terms of die area and power consumption.

To enable scalable coherency tracking in heterogeneous processing systems, embodiments described herein manage system coherency by utilizing page table structures and atomic paging operations. A page table structure (e.g., OS page tables) are used to enable shared virtual memory in which a set of one or more CPUs and GPUs can view a single virtual space for an application. Pointers to various surfaces and other items in memory can be seamlessly passed between the CPU and GPU compute elements without incurring the penalties associated with data copies between CPU and GPU address space. Embodiments described herein provide an extension to paging structures to additionally include ownership metadata for one or more blocks of memory within a page, which allows compute entities within a heterogeneous processing system to pass exclusive rights seamlessly via the page table entry for the block of data.

Figure 16:
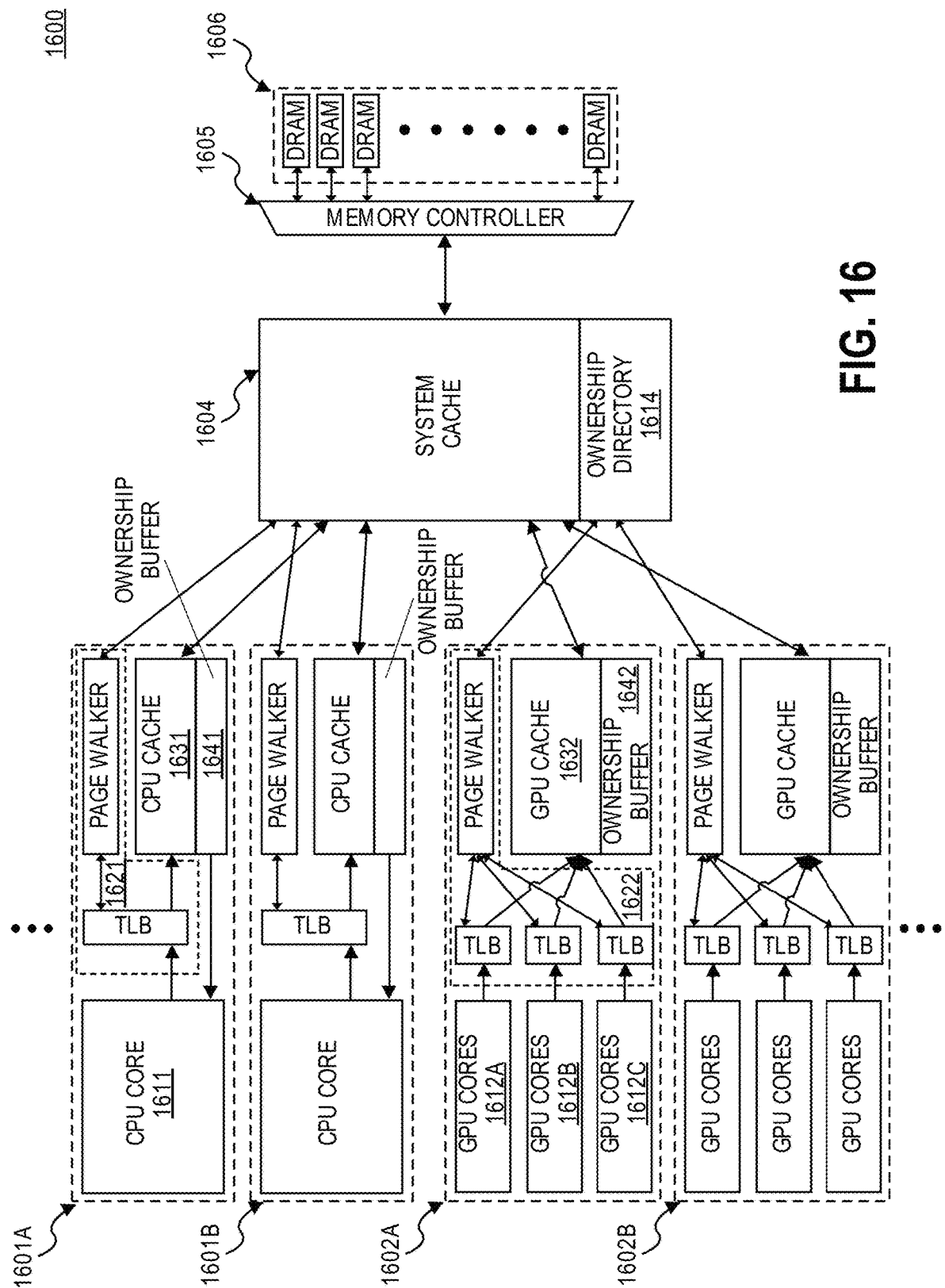
FIG. 16 is a block diagram of an exemplary heterogeneous compute system.

FIG. 16 is a block diagram of an exemplary heterogeneous compute system 1600. The exemplary heterogeneous compute system 1600 includes a group of general purpose application processors (e.g., 1601A, 1601B) and a group of graphics processors (e.g., 1602A, 1602B), which may be general purpose graphics processors that can execute operations in parallel with the general purpose application processors.

In the exemplary heterogeneous compute system 1600, each application processor includes one or more processor cores (e.g., CPU core 1611). The application processors can also have a virtual memory translation system 1621 that includes page walker logic and a translation lookaside buffer (TLB). The application processors can also include cache memory, such as CPU cache 1631, which may be a level-two (L2) cache for the CPU. The CPU cache 1631 can include an ownership buffer 1641 for tracking cache line ownership for the cache coherency protocol used to maintain coherency between the various system caches.

In the exemplary heterogeneous compute system 1600, each graphics processor includes a cluster of GPU cores (e.g., GPU core 1612A, GPU core 1612B, GPU core 1612C), which can share to a GPU cache 1632. The cluster of GPU core also has a virtual memory translation system 1622 that includes a TLB for each GPU core 1612A-1612C and page walker logic. The GPU cache 1632 also includes coherency tracking data structures, such as an ownership buffer 1642 for tracking cache line ownership.

The application processors and graphics processors couple to a system cache 1604, which can be a last level cache for the heterogeneous processing system 1600. The system cache 1604 can also include coherency control structures, such as an ownership directory 1614. The system cache 1604 couples with a memory controller 1605 which controls access to system memory 1606, which may be dynamic random access memory (DRAM).

In the exemplary heterogeneous compute system 1600, the CPU caches (e.g., CPU cache 1631) and GPU caches (e.g., GPU cache 1632) for the application processors 1601A, 1601B and graphics processors 1602A, 1602B may be inclusive or non-inclusive level-two (L2) caches which are connected to a common coherency structure. In case of inclusive caches, there is a strict protocol between the higher level coherency structures, such as the system cache 1604, where each cache line is tracked for presence within an L2 cache. The coherency tracking used for inclusive caches can reduce the instances of back snooping of caches for memory accesses from any of the compute elements. Without such tracking the system may introduce a large amount of snoop traffic into the memory bus, which can hamper the scaling of compute resources.

For non-inclusive cache structures, either a directory or a snoop filter is implemented at an appropriate level of granularity for the system, which may be between a 64-byte cache line to a 4 kilobyte page, and a level of inclusiveness is maintained between a directory and the L2 caches. In this configuration, a directory or snoop filter hit guarantees that there is at least one copy of a requested block in the various system caches, while a directory or snoop filter miss requires a probe of all system caches. Various coherency tracking protocols may be used which track coherency states based on one or more of modified, invalid, shared, exclusive, and/or owned as described above.

The high degree of parallelism achievable by the cluster of GPU cores (e.g., 1612A-1612C) with each graphics processor can place bandwidth pressure on the memory system. Existing coherency tracking systems may impose a limit on the degree to which the exemplary heterogeneous compute system 1600 may be scaled. For example, existing methods of tracking coherence, either via inclusive caches or via directory structures, utilize dedicated hardware structures which may be costly in nature. Limiting the size of the dedicated hardware structures to reduce cost may result in significant performance consequence.

In the case of inclusive caches each line in that is in a CPU cache (e.g., CPU cache 1631) or GPU cache (e.g., GPU cache 1632) is replicated in the next level inclusive cache, for example, a last level cache stored within the system 1604. Thus, replication requires a much larger system cache 1604, which is not as effectively populated as the system cache 1604 is primarily used to track system ownership of lower level caches, and the size of the last level cache for the heterogeneous processing system 1600 becomes a limiting factor as system is scaled. Inclusive caches also suffer from the requirement of back-invalidates when a line has to be victimized due to last level cache capacity limitations within the system cache 1604. Such victim selections may be performed without the knowledge of frequently accessed (e.g., hot) cache lines within lower level L2 caches, resulting in the eviction of frequently used cache data due to a lack of capacity within the coherency tracking system.

Tracking coherence for non-inclusive caches via directory and/or snoop filter has similar results as with inclusive caches. Even though the coherency data storage requirement is relatively smaller, extraction of data is performed from memory, rather than being provided from a local, on-die cache. While L2 to L2 cache transfers may be enabled to avoid an access to system memory 1606, enabling such transfers introduces significant complexity to the system. With directory/snoop-filter mechanisms, a capacity limitation is imposed, where back invalidations are performed in a manner similar to inclusive cache systems.

Managing Data Coherency Via Shared Virtual Memory

Embodiments described herein can address the issues presented with existing hardware based coherency tracking by removing the coherency tracking systems (e.g., ownership buffers 1641, 1642 and ownership directory 1614) and moving the related metadata to shared memory and to other hardware components. In one embodiment coherency tracking is performed via the shared OS managed page tables, providing an effectively infinite directory structure, which eliminates back invalidations due to directory structure capacity issues. In one embodiment, hardware coherency information is stored as part of a translation lookaside buffer (TLB) that is coupled to each GPU and CPU in the system for use in virtual to physical address translation. Such approach eliminates the need for a block cache or buffer and associated tags and comparison structures. Instead, coherency information can be extracted from the TLBs as part of the page translation flow.

The amount of metadata that to be recorded when tracking coherency is based on the minimum coherence granularity. Hardware systems can track coherency at the cache line level up to the page level. In one embodiment, block level coherency is achieved by adding an additional byte to a page table entry for a page, with four bits defined for the CPU and four bits defined for the GPU, enabling a minimum block size of one kilobyte. The granularity of the block size can be adjusted by adding more bits to the page table entry to enable smaller block sizes (e.g., down to a 64-byte cache line) or grouping and/or reducing the number of bits if larger blocks of shared memory are acceptable (e.g., up to a four kilobyte block). In one embodiment the additional bits to track coherency are directly added to page table entries within the page table. In one embodiment the additional bits are implemented as a redirection from a page table entry. Depending on the current memory operation, a CPU or GPU can set and clear ownership flags via an atomic memory access.

The metadata within the page table entries can also be recorded as part of the TLB structure, which can also be used to store additional OS page table attribute metadata, in addition to virtual to physical address translation data. The ownership bits for a block of memory can be added to existing OS page table attributes within the TLB structure.

Figure 17:
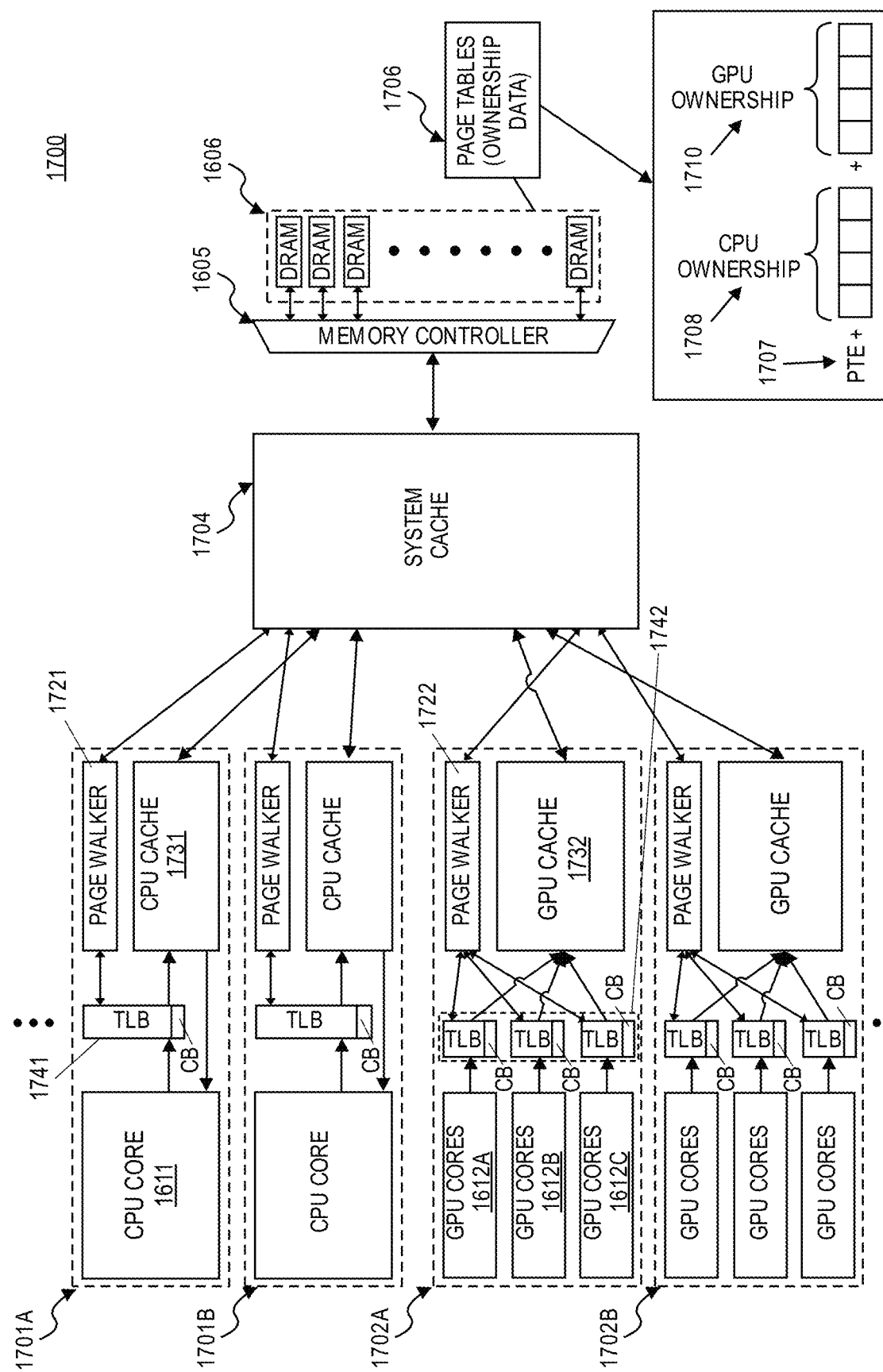
FIG. 17 is an illustration of a heterogeneous processing system using shared virtual memory to manage data coherency, according to an embodiment.

FIG. 17 is an illustration of a heterogeneous processing system 1700 using shared virtual memory to manage data coherency, according to an embodiment. In one embodiment the heterogeneous processing system 1700 can include application processors (1701A, 1701B) and graphics processors (1702A, 1702B), which may be similar to the application processors (1601A, 1601B) and graphics processors (1602A, 1602B) of FIG. 16, and may include the same or similar CPU and GPU execution resources (e.g., CPU core 1611, GPU cores 1612A-1612C), or in one embodiment can include different execution resources. The application processors (1701A, 1701B) and graphics processors (1702A, 1702B) can each couple to a system cache 1704, which may be a last level cache for the heterogeneous processing system 1700.

In one embodiment the application processors (1701A, 1701B) and graphics processors (1702A, 1702B) each include revised cache memory designs relative to exiting implementations, such as exemplary CPU cache 1731 and exemplary GPU cache 1732. Each instance of an application processor and graphics processor can include the same components as each other instance. The cache memories can exclude the ownership buffers and other cache coherency directory information of existing cache memories, while hardware coherency information is transferred to the virtual to physical memory translation system (e.g., page walker 1721, page walker 1722, TLB 1741, TLBs 1742, page tables 1706).

In one embodiment, an exemplary write flow from a GPU (e.g., graphics processor 1702A) with an ownership exchange via a CPU (e.g., application processor 1701A) can proceed as follows. A GPU core (e.g., GPU core 1612A) can issue a write request to a GPU cache 1732 for a first memory address via an associated TLB of the TLBs 1742. If the request misses, the request can be forwarded to a page miss handler associated with page walker logic (e.g., page walker 1722).

The page miss handler for each of the application processors 1701A, 1701B and graphics processors 1702A, 1702B can be implemented via integrated page walker logic (e.g., page walker 1721, page walker 1722, etc.) or can be associated with software TLB management logic of an OS executing on the heterogeneous processing system 1700. The page miss handler associated with graphics processor 1702A can detect that the requested first memory address is part of a first page. Via page walker 1722, the page miss handler associated with graphics processor 1702A initiates a page walk through the page tables 1706 of the system. The page walk can reach the page table entry (PTE 1707) and related ownership metadata (CPU ownership 1708, GPU ownership 1710) for the first page. The ownership metadata can indicate a specific CPU core or GPU core(s) that have ownership of the block of memory associated with the PTE 1707. Via an atomic read operation, the page walker 1722 can retrieve the PTE 1707 and related ownership metadata.

In the event CPU ownership is detected for the requested portion of the first page related to the requested first address, the page miss handler for graphics processor 1702A can forward a block ownership request to the page miss handler for application processor 1701A. In one embodiment, a page miss handler associated with application processor 1701A can clear ownership flags in a coherency buffer (CB) of the TLB 1741 after ensuring all cache lines within the block of the requested first page are flushed from the CPU cache 1731. Application processor 1701B, and each other application processor, can also flush any cache lines associated with the first page and clear any TLB ownership flags. The page miss handler(s) of the application processor(s) can then return a response to the page miss handler for graphics processor 1702A to transfer ownership of the first page from the application processor(s) to the graphics processor 1702A. The page miss handler of graphics processor 1702A can then update the metadata stored in the page tables 1706. For the example, the graphics processor 1702A can update the metadata for GPU ownership 1710 to specify GPU ownership while clearing metadata for CPU ownership 1708 for the same block of page. The ownership transfer can be performed as an atomic update of the page tables 1706. The exemplary write flow from a GPU can be completed by recording the write to the GPU cache 1732. The written data can later be evicted to memory using a non-coherent path.

While the page miss handlers for graphics processors 1702A, 1702B and application processors 1701A, 1701B can communicate to manage coherency flow, in one embodiment a central block can be used to manager coherency flow. Additionally, in one embodiment each page miss handler can include multiple slots for managing page miss entries to enable page walks to be performed for multiple missed. In such embodiment, coherency flow becomes an extension of the page walk process performed by existing page miss handler logic.

Figure 18:
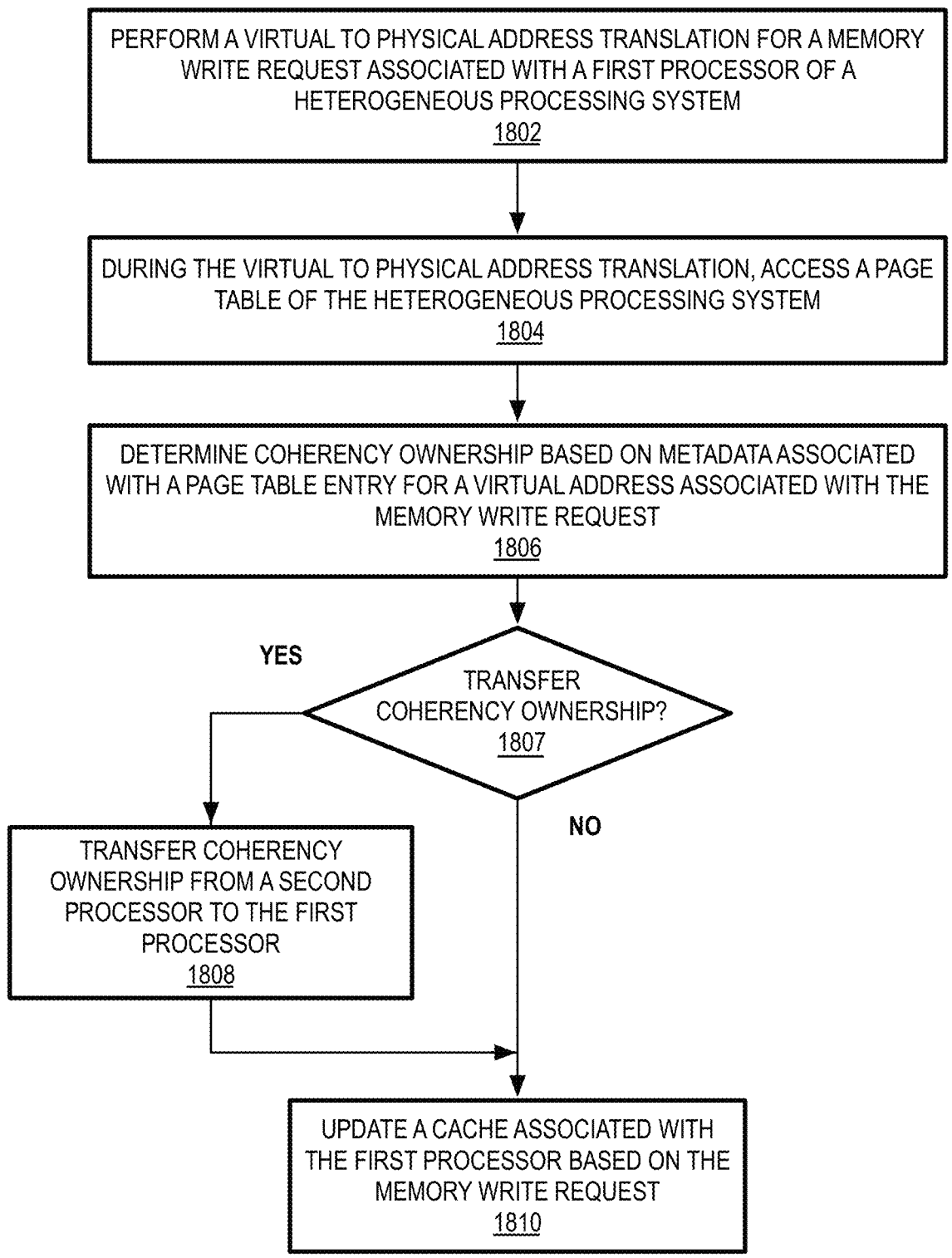
FIG. 18 is a flow diagram of data coherency logic, according to an embodiment.

FIG. 18 is a flow diagram of data coherency logic 1800, according to an embodiment. In one embodiment the illustrated data coherency logic 1800 can be performed by the virtual to physical address translation system used to enable shared virtual memory within a heterogonous processing system, including page walker/page miss handling logic and TLBs associated with each processor and OS managed page tables within shared memory.

In one embodiment the data coherency logic 1800 can perform a virtual to physical address translation for a memory write request associated with a first processor of a heterogeneous processing system, as shown at block 1802. During the virtual to physical address translation, for example, in the event of a TLB miss, the data coherency logic 1800, for example, via page walker logic or other page miss handling logic, can access a page table of the heterogeneous processing system, as shown at block 1804. The page table can be a system page table that is shared by each processor of the heterogeneous processing system, or can be one of several page tables within the system. In one embodiment the access is an atomic access (e.g., an atomic read). The access can be the end result of a page table walk used to determine the page table entry associated with a requested virtual memory address.

The data coherency logic 1800 can then determine coherency ownership based on metadata associated with a page table entry in the page table for a virtual address associated with the memory write request, as shown at block 1806. Alternatively, a TLB entry can be present for the virtual address, bypassing the need to access to the page table at block 1804. The coherency ownership determined at block 1806 can then be determined based on metadata stored in the TLB entry for the requested virtual address.

The data coherency logic 1800, based on the coherency ownership information, can determine whether to transfer coherency ownership at 1807. The data coherency logic 1800 can transfer ownership if the coherency ownership information indicates a processor other than the first processor has ownership of the block of memory associated with the requested virtual address. For example, the data coherency logic 1800 can determine to transfer coherency ownership at 1807 in association with a memory write request associated with the first processor if a second processor has ownership of the block of data. The data coherency logic 1800 can then transfer coherency ownership from the second processor to the first processor, as shown at 1808. During the transfer, any dirty cache lines associated with memory block containing the requested virtual address that stored in caches associated with the second processor can be flushed and any TLB ownership flags within the second processor can be cleared. The data coherency logic 1800 can then update a cache associated with the first processor based on the memory write request, as shown at block 1810.

Figure 19:
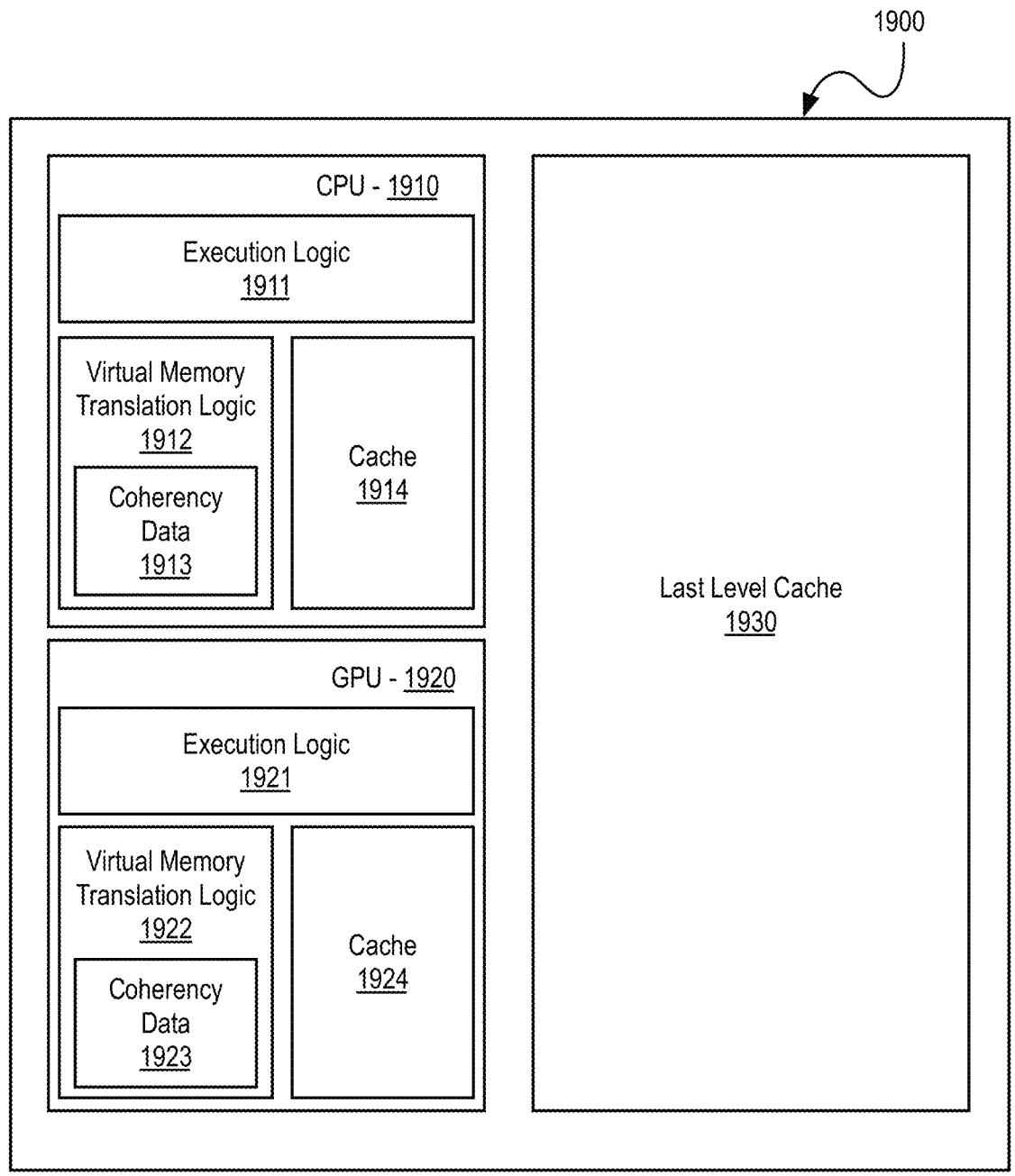
FIG. 19 is a block diagram of a heterogeneous computing device, according to an embodiment.

FIG. 19 is a block diagram of a heterogeneous computing device 1900, according to an embodiment. The heterogeneous computing device 1900 includes multiple processors having differing instruction set architectures or microarchitectures. In one embodiment the heterogeneous computing device 1900 includes at least one CPU 1910 and at least one GPU 1920. In one embodiment the CPU 1910 and the GPU 1920 can be integrated on a same, single die as a system on a chip integrated circuit. In one embodiment the CPU 1910 and the GPU 1920 are on multiple dies integrated in a system on package device, for example, as a stacked 3D integrated circuit. The CPU 1910 and the GPU 1920 can be any application and/or graphics processor described herein. The CPU 1910 and the GPU 1920 couple with a last level cache 1930, which may be a version of the system cache 1704 as in FIG. 17.

The CPU 1910 includes execution logic 1911, virtual memory translation logic 1912, and cache memory 1914. The GPU 1920 includes execution logic 1921, virtual memory translation logic 1922 and cache memory. Execution logic 1911 and execution logic 1921 support different instruction set architectures, with execution logic 1921 including graphics specific instructions and a parallel processing oriented microarchitecture, although at least some of the instructions supported by execution logic 1911 and execution logic 1921 may overlap. In one embodiment the execution logic 1921 of the GPU 1920 provides support for general purpose compute instructions.

Virtual memory translation logic 1912 within the CPU 1910 and virtual memory translation logic 1922 within the GPU 1920 enables support for virtual memory addressing. The virtual memory address space for the CPU 1910 can be configured to at least partially overlap with the virtual memory address space for the GPU 1920. In one embodiment the virtual memory address space may be completely shared and common to both the CPU 1910 and the GPU 1920, or portions of the respective address spaces may be individually mapped for one of the CPU 1910 and/the GPU 1920. In one embodiment, virtual memory translation logic 1912 for the CPU and virtual memory translation logic 1922 for the GPU 1920 each include a TLB to cache page table entries from a system page table.

Cache 1914 is configured to cache memory accesses for the CPU 1910, while cache 1924 is configured to cache memory access for the GPU 1920. The respective cache 1914 for each processor can cache memory accesses to the last level cache 1930, as well as to system memory, such as the system memory 1606 of FIG. 16 and FIG. 17.

Coherency between cache 1914 and cache 1924 can be maintained in part based on coherency data 1913 stored within virtual memory translation logic 1912 for the CPU 1910 and coherency data 1923 stored within virtual memory translation logic 1922 for the GPU 1920, for example, in the respective TLBs of the virtual memory translation logic 1912, 1922 of the CPU 1910 and the GPU 1920. The TLBs can be configured as a cache for coherency data 1913 and coherency data 1923, which can be retrieved from a system page table in conjunction with other metadata a page table entry.

In one embodiment the virtual memory translation logic 1912, 1922 include page miss handling logic, such as page walker logic that automatically performs a page table walk within the system memory in response to a TLB miss to locate a page table entry associated with a requested virtual address. During the page miss handling operation, cache coherency metadata for a block of memory associated with a requested virtual memory address can be retrieved from the page table along with a page table entry or for the block of memory.

It is to be appreciated that a lesser or more equipped system than the example described above may be preferred for certain implementations. Therefore, the configuration of the heterogeneous computing device 1900 may vary from implementation to implementation depending upon numerous factors, such as price constraints, performance requirements, technological improvements, or other circumstances. The heterogeneous computing device 1900 may be integrated into various computing systems including (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, where the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

The embodiments described herein implement system coherence via shared virtual memory, enabling a reduction in hardware investment while providing a scalable solution for cache coherency within massively parallel compute systems including a large number of per-processor cache memories. In one embodiment coherency state tracking is stored in memory in conjunction with page table entries and is managed in conjunction with virtual memory translation data. In one embodiment TLBs on each processor are configured to store the coherency state data along with other page table entry metadata. Coherency state can be managed in conjunction with virtual memory translation for a block of memory.

One embodiment provides for a heterogeneous computing device comprising a first processor coupled with a second processor, where one or more of the first or second processor includes graphics processing logic. Each of the first processor and the second processor includes first logic to perform virtual to physical memory address translation. The first logic includes cache coherency state for a block of memory associated with a virtual memory address.

One embodiment provides for a method of managing data coherency in a heterogeneous processing system, the method comprising performing a virtual to physical address translation for a memory write request associated with a first processor of the heterogeneous processing system; determining coherency ownership based on metadata associated with a page table entry for a virtual address associated with the memory write request; and updating a cache associated with the first processor based on the memory write request after determining coherency ownership for a block of memory associated with the requested virtual address.

One embodiment provides for a heterogeneous processing system comprising a first processor including a first cache memory; a second processor including a second cache memory, the second processor including one or more graphics processor cores; a third cache memory coupled to the first processor and the second processor; and system memory coupled to the third cache memory, the system memory to store a page table including a virtual to physical address mapping and a coherency state for a block of memory shared between the first processor and the second processor.

One embodiment provides a heterogeneous computing device comprising a graphics processor coupled with an application processor. The graphics processor and the application processor each include a cache memory and first circuitry to perform virtual to physical memory address translation. The first circuitry is configured to manage cache coherency state concurrently with performing virtual to physical memory address translation. The first circuitry is configured to, concurrently with an address translation associated with a write to a virtual memory address of a block of memory, determine a cache coherency state for a cache line associated with the block of memory based on cache coherency metadata stored in association with virtual to physical memory address translation data for the block of memory. Based on the cache coherency state, the first circuitry can transfer coherency ownership for the cache line between the graphics processor and the application processor. The first circuitry of each of the graphics processor and the application processor is configured to transfer coherency ownership via a response sent between the graphics processor and application processor.

In a further embodiment, based on the response sent between the graphics processor and application processor, the first circuitry of each of the graphics processor and the application processor is to set coherency ownership to indicate ownership for the graphics processor and clear coherency ownership for the application processor or clear coherency ownership for the graphics processor and set coherency ownership for the application processor. Data of the block of memory can be stored in one or more cache lines of the cache memory of the graphics processor and concurrently stored in one or more cache lines of the cache memory of the application processor. The cache lines that store data for the block of memory can have a cache coherency state configured based on which of the graphics processor and application processor has coherency ownership of the block of memory. In one embodiment the first circuitry includes a translation lookaside buffer (TLB) to cache a virtual to a physical address translation for the block of memory and cache coherency state associated with the block of memory. In one embodiment the TLB is to store the cache coherency state in a coherency buffer and the first circuitry is to determine the cache coherency state associated with the block of memory based on an entry in the coherency buffer. In one embodiment the first circuitry includes a page walker to walk a page table in response to a TLB miss for virtual to physical memory address translation data for the block of memory. The page walker, in response to the TLB miss in the for the virtual to physical memory address translation data for the block of memory, is configured to read the virtual to physical memory address translation data for the block of memory and the cache coherency metadata for the block of memory from the page table, write the virtual to physical memory address translation data for the block of memory to a page table entry of the TLB, and write the cache coherency metadata for the block of memory to the entry in the coherency buffer. In one embodiment the page table is to store the cache coherency metadata for the block of memory at sub-page granularity. In one embodiment, the page table is to store the cache coherency metadata for the block of memory at cache line granularity.

One embodiment provides a method of managing data coherency in a heterogeneous processing system, the method comprising performing a virtual to physical memory address translation for a memory write request to a block of memory having a virtual memory address and concurrently with the virtual to physical memory address translation, managing cache coherency state for one or more cache lines associated with the block of memory. The cache lines are within a cache memory of a graphics processor of the heterogeneous processing system and a cache memory of an application processor of the heterogeneous processing system. Managing the cache coherency state includes determining the cache coherency state associated with the block of memory based on cache coherency metadata stored in association with virtual to physical memory address translation data for the block of memory and based on the cache coherency state, transferring coherency ownership associated with the block of memory between the graphics processor and the application processor. Address translation circuitry of each of the graphics processor and the application processor is configured to transfer coherency ownership via a response sent between the graphics processor and application processor.

One embodiment provides a heterogeneous processing system comprising a graphics processor including a first cache memory and a first circuit, the first circuit to perform virtual to physical memory address translation and manage cache coherency state, an application processor including a second cache memory and a second circuit, the second circuit to perform virtual to physical memory address translation and manage cache coherency state, a third cache memory coupled to the graphics processor and the application processor, the third cache memory to cache a block of memory shared between the graphics processor and the application processor, and system memory coupled to the third cache memory. The system memory is configured to store a page table including a virtual to physical memory address mapping and a cache coherency state, the cache coherency state including coherency ownership information for one or more cache lines associated with the block of memory. In association with a write request to the block of memory by the application processor or the graphics processor, the first circuit or the second circuit is configured to perform a virtual to physical memory address translation for a virtual memory address of the block of memory, and concurrently with the virtual to physical memory address translation, determine the cache coherency state associated with the block of memory based on the cache coherency state, and based on the cache coherency state, transfer cache coherency ownership associated with the block of memory between the graphics processor and the application processor, The first circuit and the second circuit are to transfer coherency ownership via a response sent between the graphics processor and application processor.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A heterogeneous computing device comprising:
a graphics processor coupled with an application processor, wherein the graphics processor and the application processor each include a cache memory and first circuitry to perform virtual to physical memory address translation for a unified virtual memory system including a common virtual memory address space in which a complete virtual address space of the graphics processor is shared with the application processor; and
wherein the first circuitry is to manage cache coherency state concurrently with virtual to physical memory address translation for an address in the unified virtual memory system and, concurrently with an address translation associated with a write to a virtual memory address of a block of memory, the first circuitry is to:
determine a cache coherency state for a cache line associated with the block of memory based on cache coherency metadata stored contiguously with virtual to physical memory address translation data for the block of memory, the coherency ownership and the virtual to physical memory address translation data determined via a single read operation that is performed based on the virtual memory address of the block of memory; and
based on the cache coherency state, determine coherency ownership for the cache line; and
based on the coherency ownership, transfer the coherency ownership for the cache line between the graphics processor and the application processor.

2. The heterogeneous computing device of claim 1, wherein the first circuitry of each of the graphics processor and the application processor is to transfer coherency ownership via a response sent between the graphics processor and application processor.

3. The heterogeneous computing device of claim 2, wherein based on the response sent between the graphics processor and application processor, the first circuitry of each of the graphics processor and the application processor is to set coherency ownership to indicate ownership for the graphics processor and clear coherency ownership for the application processor or clear coherency ownership for the graphics processor and set coherency ownership for the application processor.

4. The heterogeneous computing device of claim 3, wherein data of the block of memory is stored in one or more cache lines of the cache memory of the graphics processor and concurrently stored in one or more cache lines of the cache memory of the application processor, and the one or more cache lines that store data for the block of memory have a cache coherency state configured based on which of the graphics processor and application processor has coherency ownership of the block of memory.

5. The heterogeneous computing device of claim 1, wherein the first circuitry includes a translation lookaside buffer (TLB) to cache a virtual to a physical address translation for the block of memory and cache coherency state associated with the block of memory.

6. The heterogeneous computing device of claim 5, wherein the TLB is to store the cache coherency state in a coherency buffer and the first circuitry is to determine the cache coherency state associated with the block of memory based on an entry in the coherency buffer.

7. The heterogeneous computing device of claim 6, wherein the first circuitry includes a page walker to walk a page table in response to a TLB miss for virtual to physical memory address translation data for the block of memory.

8. The heterogeneous computing device of claim 7, wherein the page walker, in response to the TLB miss for the virtual to physical memory address translation data for the block of memory, is to:
  read the virtual to physical memory address translation data for the block of memory and the cache coherency metadata for the block of memory from the page table;
  write the virtual to physical memory address translation data for the block of memory to a page table entry of the TLB; and
  write the cache coherency metadata for the block of memory to the entry in the coherency buffer.

9. The heterogeneous computing device of claim 8, wherein the page table is to store the cache coherency metadata for the block of memory at sub-page granularity.

10. The heterogeneous computing device of claim 9, wherein the page table is to store the cache coherency metadata for the block of memory at cache line granularity.

11. A method of managing data coherency in a heterogeneous processing system, the method comprising
  performing a virtual to physical memory address translation for a memory write request to a block of memory having a virtual memory address in a unified virtual memory address space in which a complete virtual address space of a graphics processor is shared with an application processor;
  concurrently with the virtual to physical memory address translation, determining coherency ownership associated with the block of memory based on cache coherency metadata stored contiguously with virtual to physical memory address translation data for the block of memory, the coherency ownership and the virtual to physical memory address translation data determined via a single read operation that is performed based on the virtual memory address of the block of memory, wherein the block of memory is accessible to the graphics processor and the application processor via the virtual memory address; and
  transferring coherency ownership associated with the block of memory between the graphics processor and the application processor.

12. The method of claim 11, further comprising transferring the coherency ownership between the graphics processor and the application processor via address translation circuitry of the graphics processor and the application processor.

13. The method of claim 12, wherein the memory write request is by the graphics processor and transferring coherency ownership associated with the block of memory includes:
  sending, by a first address translation circuit associated with the graphics processor, a request to a second address translation circuit associated with the application processor, wherein the request is a request to obtain coherency ownership for cache lines associated with the block of memory;
  receiving, at the first address translation circuit, from the second address translation circuit, a response to the request, wherein the response is a transfer ownership response; and
  after receiving the response at the first address translation circuit, setting coherency ownership in the cache coherency metadata of the first address translation circuit to indicate ownership for a core of the graphics processor taking ownership of the block of memory and clearing coherency ownership for the core of the application processor previously having ownership in the cache coherency metadata of the first address translation circuit.

14. The method as in claim 13, additionally comprising:
  receiving the request to obtain coherency ownership at the second address translation circuit;
  setting the coherency ownership in the cache coherency metadata of the second address translation circuit to indicate ownership for the core of the graphics processor taking ownership of the block of memory and clearing coherency ownership for the core of the application processor previously having ownership in the cache coherency metadata; and
  sending, by the second address translation circuit, to the first address translation circuit, the transfer ownership response.

15. The method as in claim 14, additionally comprising flushing one or more dirty cache lines associated with the block of memory from a cache memory of the application processor.

16. The method as in claim 15, additionally comprising updating the cache lines associated with the block of memory in a cache memory of the graphics processor.

17. The method as in claim 16, wherein performing the virtual to physical memory address translation includes:
  determining that a translation lookaside buffer (TLB) of the graphics processor lacks information to perform the virtual to physical memory address translation;
  accessing a page table of the heterogeneous processing system to retrieve a page table entry for the virtual memory address associated with the memory write request; and
  storing the page table entry and the cache coherency metadata associated with the page table entry in the TLB of the graphics processor.

18. A heterogeneous processing system comprising:
  a graphics processor including a first cache memory and a first circuit, the first circuit to perform virtual to physical memory address translation and manage cache coherency metadata;
  an application processor including a second cache memory and a second circuit, the second circuit to perform virtual to physical memory address translation and manage cache coherency metadata;
  a third cache memory coupled to the graphics processor and the application processor, the third cache memory to cache data in a block of memory shared between the graphics processor and the application processor, wherein the graphics processor and the application processor have a unified virtual memory system including a common virtual memory address space in which a complete virtual address space of the graphics processor is shared with the application processor;

system memory coupled to the third cache memory, the system memory to store a page table including a virtual to physical memory address mapping for the common virtual memory address space and the cache coherency metadata, the cache coherency metadata stored contiguously with the virtual to physical memory address mapping, the cache coherency metadata including coherency ownership information for one or more cache lines associated with the block of memory; and wherein in association with a write request to the block of memory by the application processor or the graphics processor, the first circuit or the second circuit is to:

perform a virtual to physical memory address translation for a virtual memory address of the block of memory based on an entry in the virtual to physical memory address mapping;

concurrently with the virtual to physical memory address translation, determine coherency ownership associated with the block of memory via a single read operation that is performed based on the virtual memory address of the block of memory; and transfer coherency ownership associated with the block of memory between the graphics processor and the application processor.

19. The heterogeneous processing system as in claim 18, wherein the page table is to store the coherency ownership for the block of memory at sub-page granularity.

20. The heterogeneous processing system as in claim 19, wherein the write request to the block of memory is by the graphics processor and to perform a virtual to physical memory address translation in association with the write request includes to:

determine that a translation lookaside buffer (TLB) of the graphics processor lacks information to perform the virtual to physical memory address translation;

access the page table to retrieve a page table entry for the virtual memory address associated with the write request; and store the page table entry and the coherency ownership associated with the page table entry in the TLB of the graphics processor.

* * * * *